United States Patent
Kuwahara et al.

(10) Patent No.: US 7,307,926 B2
(45) Date of Patent: Dec. 11, 2007

(54) APPARATUS AND METHOD FOR TRACKING CONTROL

(75) Inventors: Masaya Kuwahara, Suita (JP); Kiyoshi Masaki, Amagasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 582 days.

(21) Appl. No.: 10/664,719

(22) Filed: Sep. 17, 2003

(65) Prior Publication Data

US 2004/0190397 A1    Sep. 30, 2004

(30) Foreign Application Priority Data

Sep. 18, 2002   (JP) .............................. 2002-271119

(51) Int. Cl.
   *G11B 7/00*   (2006.01)
(52) U.S. Cl. .................................. 369/44.29; 369/44.36
(58) Field of Classification Search ...................... None
   See application file for complete search history.

(56) References Cited

U.S. PATENT DOCUMENTS

| | | | | |
|---|---|---|---|---|
| 4,700,334 A | * | 10/1987 | Shinkai ................... | 369/44.26 |
| 4,890,273 A | * | 12/1989 | Takeuchi et al. ......... | 369/44.36 |
| 5,175,719 A | * | 12/1992 | Iimura .................... | 369/44.29 |
| 5,442,609 A | * | 8/1995 | Yanagawa ................ | 369/44.28 |
| 5,526,329 A | * | 6/1996 | Bish et al. ............. | 369/124.11 |
| 5,559,770 A | * | 9/1996 | Hiroki et al. ............ | 369/44.35 |
| 6,556,525 B1 | * | 4/2003 | Takiguchi ................ | 369/53.24 |
| 6,704,263 B1 | * | 3/2004 | Nijboer et al. ........... | 369/59.21 |
| 2002/0105865 A1 | * | 8/2002 | Kusumoto et al. ....... | 369/44.29 |
| 2002/0150005 A1 | * | 10/2002 | Nishiuchi ................ | 369/44.29 |

FOREIGN PATENT DOCUMENTS

| | | |
|---|---|---|
| JP | 60-138740 | 7/1985 |
| JP | 04-061034 A | 2/1992 |
| JP | 06-333248 A | 12/1994 |

* cited by examiner

*Primary Examiner*—William R. Korzuch
*Assistant Examiner*—Christopher Lamb
(74) *Attorney, Agent, or Firm*—Akin Gump Strauss Hauer & Feld LLP

(57) ABSTRACT

A tracking controller includes a tracking error detecting section and a tracking control section. The tracking error detecting section generates and outputs a tracking error signal that represents how much the focal point of a light beam has shifted from a target track on a storage medium. The tracking control section generates a drive signal in response to the tracking error signal so as to move the light beam such that the focal point of the light beam is located right on the target track. The gain of at least one of the tracking error signal and the drive signal is switched depending on whether or not the focal point of the light beam is located on a recorded area of the storage medium on which data has already been written.

15 Claims, 20 Drawing Sheets

← INWARD    OUTWARD →

APPARATUS AND METHOD FOR TRACKING CONTROL

BACKGROUND OF THE INVENTION

1. Field of the Invention

The present invention relates to an apparatus and method for performing a tracking control in a system for reading or writing data from/on a storage medium by means of a light beam.

2. Description of the Related Art

FIG. 15 is a block diagram showing a conventional tracking controller for use in a system for reading or writing data from/on a storage medium by means of a light beam (e.g., an optical disc drive). In the example illustrated in FIG. 15, the storage medium (typically in a disk shape) 1 that has been loaded into this system is a DVD-R disc. As shown in FIG. 15, the optical head 2 includes a semiconductor laser diode 2a (which emits a laser beam with a wavelength of about 650 nm, for example), a collimator lens 2b, a polarization beam splitter 2c, a wave plate 2d, a convergent lens 2e, a photo-detecting hologram 2f, a detector lens 2g, a plus-first-order photodetector 2h, a minus-first-order photodetector 2i and a tracking coil 2j.

The light beam that has been emitted from the semiconductor laser diode 2a is collimated by the collimator lens 2b into a parallel beam, which is passed through the polarization beam splitter 2c and the wave plate 2d and then focused by the convergent lens 2e onto the data storage layer of the disc 1.

The focused beam is reflected back from the data storage layer and then passes the same convergent lens 2e and wave plate 2d again following the same optical path. Thereafter, the reflected light beam is split by the polarization beam splitter 2c into two, one of which is separated from the original optical path so as to be incident onto the photo-detecting hologram 2f. On receiving the separated light beam, the photo-detecting hologram 2f diffracts the light beam by splitting it into a minus-first-order light beam for detecting tracking errors (which will be referred to herein as a "tracking-error-detecting minus-first-order light beam") and a plus-first-order light beam for detecting focus errors (which will be referred to herein as a "focus-error-detecting plus-first-order light beam"). Subsequently, the tracking-error-detecting minus-first-order light beam and the focus-error-detecting plus-first-order light beam are incident onto the minus-first-order photodetector 2i and the plus-first-order photodetector 2h, respectively, and then converted into electric signals.

The output of the plus-first-order photodetector 2h is a focus error signal representing the focusing state of the light beam on the data storage layer of the disc 1. The position of the convergent lens 2e is controlled such that the focus error signal equals zero. This type of control is called a "focus control". The focus control is well known in the art, and the detailed description thereof will be omitted herein.

The minus-first-order photodetector 2i includes two divided detecting areas A and B as shown in FIG. 16. The direction in which the boundary between these two detecting areas A and B extends corresponds with the direction in which the tracking-error-detecting minus-first-order light beam follows the tracks on the disc (i.e., the tracking direction). That is to say, a light beam that has been reflected from an outside portion of a track enters the detecting area A, while a light beam that has been reflected from an inside portion of the track enters the detecting area B. Then, the tracking-error-detecting minus-first-order light beams that have been detected at the detecting areas A and B are converted into electric signals, which are output as signals TR1 and TR2 to a tracking error detecting section 3.

The tracking error detecting section 3 generates a tracking error signal from the output signals TR1 and TR2 of the minus-first-order photodetector 2i by a push-pull method. Also, the tracking error detecting section 3 normalizes the tracking error, detected by the push-pull method, with (TR1+TR2), i.e., the sum of the output signals of the minus-first-order photodetector 2i. Accordingly, the TE signal, which is the output signal of the tracking error detecting section 3, is given by the following Equation (1):

$$TE=(TR1-TR2)/(TR1+TR2) \quad (1)$$

In Equation (1), the tracking error, detected by the push-pull method, is divided by the sum (TR1+TR2) of the signals TR1 and TR2. This is done to prevent the tracking error detection sensitivity from being affected by any change in the intensity of the light beam that has been reflected from the disc 1 even if the output power of the semiconductor laser diode 2a or the reflectance of the disc 1 changes while a read or write operation is being carried out on the disc 1.

Next, a tracking control section 4 subjects the TE signal to phase compensation, transforms its signal intensity into a variation in current, and supplies the current to the tracking coil 2j. In accordance with the output of the tracking control section 4, the tracking coil 2j drives the convergent lens 2e in the disc radial direction. In this manner, the light beam can be controlled so as not to lose tracks.

In accordance with a track jump instruction from a microcomputer 10, a transport stage 9 controls a move of the optical head 2 in the disc radial direction if the move is too big for the tracking coil 2j to cope with. For example, to move the optical head 2 to right under a predetermined track, the optical head 2 is roughly moved first by the transport stage 9 to around the predetermined track and then precisely controlled by the tracking coil 2j so as to catch and keep that track.

Japanese Laid-Open Publication No. 60-138740 discloses a tracking controller including a voltage generator and a multiplier. The voltage generator generates a voltage to be multiplied by a tracking error (TE) signal. The multiplier multiplies the TE signal by the output voltage of the voltage generator. In this tracking controller, based on the level of the TE signal when the light beam crosses a track on the disc 1 while the tracking servo loop is OFF, the voltage generator defines the output voltage such that the level of the TE signal, which is the output of the multiplier, equals a predetermined value.

In the conventional tracking controller, the amplitude of the TE signal, detected by the Equation (1) described above, on an information recorded area of the disc 1 is supposed to be equal to, or at least almost equal to, that of the TE signal on an information unrecorded area thereof.

FIGS. 17A and 17B show the amplitudes of the TE signals on a data unrecorded area and on a data recorded area of a DVD-R, respectively. As shown in FIGS. 17A and 17B, the sum of the signals TR1 and TR2 is greater in the unrecorded area than in the recorded area. Accordingly, the TE signal in the recorded area has the greater amplitude than the TE signal in the unrecorded area.

Consequently, if recorded areas and unrecorded areas are both present on the same disc 1, then the TE signal changes its amplitude location by location (i.e., depending on whether the light beam spot is located on a recorded area or on an unrecorded area of the disc 1). Accordingly, the gain of the tracking control loop for the data recorded area is also different from that of the tracking control loop for the data unrecorded area. As a result, the accuracy or stability of the tracking control decreases significantly.

SUMMARY OF THE INVENTION

In order to overcome the problems described above, preferred embodiments of the present invention provide an apparatus and method for performing a tracking control with sufficiently high accuracy and stability even on a rewritable or recordable storage medium on which data recorded and unrecorded areas are both present.

A tracking controller according to a preferred embodiment of the present invention preferably includes a tracking error detecting section and a tracking control section. The tracking error detecting section preferably generates and outputs a tracking error signal that represents how much the focal point of a light beam has shifted from a target track on a storage medium. The tracking control section preferably generates a drive signal in response to the tracking error signal so as to move the light beam such that the focal point of the light beam is located right on the target track. The gain of at least one of the tracking error signal and the drive signal is preferably switched depending on whether or not the focal point of the light beam is located on a recorded area of the storage medium on which data has already been written.

According to the tracking controller of the preferred embodiment of the present invention, the gain of at least one of the tracking error signal and the drive signal is switched depending on whether or not the focal point of the light beam is located on a recorded area of the storage medium on which data has already been written. Therefore, it is possible to make a loop gain of the tracking control at a constant level regardless of reading or writing data from/on the storage medium, thereby realizing a tracking controller which can operate at high accuracy and stability.

In one preferred embodiment of the present invention, the tracking controller preferably further includes a tracking error amplitude adjusting section for multiplying the tracking error signal by a predetermined proportionality constant. The gain of the tracking error signal is preferably switched by changing the proportionality constant depending on whether or not the focal point of the light beam is located on the recorded area.

A tracking controller according to another preferred embodiment of the present invention preferably also includes a tracking error detecting section and a tracking control section. The tracking error detecting section preferably generates and outputs a tracking error signal that represents how much the focal point of a light beam has shifted from a target track on a storage medium. The tracking control section preferably generates a drive signal in response to the tracking error signal so as to move the light beam such that the focal point of the light beam is located right on the target track. The gain of at least one of the tracking error signal and the drive signal is preferably switched depending on whether or not data is being written on the storage medium.

In one preferred embodiment of the present invention, the tracking controller preferably further includes a tracking error amplitude adjusting section for multiplying the tracking error signal by a predetermined proportionality constant. The gain of the tracking error signal is preferably switched by changing the proportionality constant depending on whether or not data is being written on the storage medium.

In another preferred embodiment, the tracking controller preferably further includes a tracking gain calculating section for calculating and storing a gain of a tracking control loop, which is defined by the tracking error detecting section, the tracking error amplitude adjusting section and the tracking control section, at an arbitrary frequency. A ratio of the gain that has been calculated by the tracking gain calculating section for the recorded area, on which the data has been written, to the gain that has been calculated by the tracking gain calculating section for an unrecorded area, on which the data has not yet been written, is preferably used as the proportionality constant.

In still another preferred embodiment, the tracking controller further comprises a tracking gain calculating section for calculating and storing a gain of a tracking control loop, which is defined by the tracking error detecting section and the tracking control section, at an arbitrary frequency. The gain is switched depending on the gain that has been calculated by the tracking gain calculating section for the recorded area, on which the data has been written and the gain that has been calculated by the tracking gain calculating section for an unrecorded area, on which the data has not yet been written.

In yet another preferred embodiment, the tracking controller, further comprises a tracking error amplitude measuring section for measuring the amplitude of the tracking error signal. A ratio of the gain that has been calculated by the tracking gain calculating section for the recorded area, on which the data has been written, to the gain that has been calculated by the tracking gain calculating section for an unrecorded area, on which the data has not yet been written, is used as the proportionality constant.

In yet another preferred embodiment, the tracking controller, further comprises a tracking error amplitude measuring section for measuring the amplitude of the tracking error signal. The gain is switched depending on the amplitude that has been measured by the tracking error amplitude measuring section for the recorded area, on which the data has been written and the amplitude that has been measured by the tracking error amplitude measuring section for an unrecorded area, on which the data has not yet been written.

In these particular preferred embodiments, the tracking controller preferably further includes a light detecting section for detecting light that has been reflected from, or transmitted through, the storage medium, and an area distinguishing section for judging whether the focal point of the light beam is located on the recorded area or on the unrecorded area.

In an alternative preferred embodiment, the tracking controller may further include a light source for emitting the light beam. The unrecorded area may be turned into the recorded area by writing data on the storage medium with the light beam focused thereon. Or the recorded area may be turned into the unrecorded area by erasing data from the storage medium with the light beam focused thereon.

In another preferred embodiment, the tracking controller may further include a transport section for moving the focal point of the light beam across the tracks on the storage medium. An area distinction value is preferably defined in advance based on the outputs of the light detecting section. The area distinction value is preferably used to judge whether the focal point of the light beam is located on the recorded area or on the unrecorded area. The outputs were preferably obtained for the recorded area and the unrecorded area when the focal point of the light beam was moved by the transport section to the recorded area and to the unrecorded area, respectively. The area distinguishing section preferably determines, by the area distinction value and the outputs of the light detecting section, whether the focal point of the light beam is located on the recorded area or on the unrecorded area.

In this particular preferred embodiment, the area distinction value is preferably defined based on peak values of the light beams that have been reflected from, or transmitted through, the recorded area and the unrecorded area, respectively, during a predetermined period.

In another preferred embodiment, the storage medium may be a write-once storage medium.

In yet another preferred embodiment, management information for the storage medium may have been recorded in advance on the recorded area.

In still another preferred embodiment, the storage medium includes a region on which a test pattern to adjust the intensity of the light beam in writing data on the storage medium is to be wrote, and the region is used as the recorded area and the unrecorded area.

In yet another preferred embodiment, the storage medium may be a DVD-R disc, the recorded area may be a data area or a control data zone, and the unrecorded area may be a power calibration area.

In yet another preferred embodiment, the storage medium may be a CD-R disc or a CD-RW disc, the recorded area may be a data area or a power calibration area, and the unrecorded area may be constituted by the first or last 30 ATIP frames of a test area of the power calibration area.

In yet another preferred embodiment, the storage medium may be a DVD-RW disc, the recorded area may be a data area or a recording management area, and the unrecorded area may be a power calibration area.

In yet another preferred embodiment, the storage medium may be a high-density storage medium from/on which data is read or written by means of a light beam with a wavelength of 405 nm, the recorded area may be a permanent information and control data area or an optimum power control area, and the unrecorded area may be another optimum power control area.

An optical disc drive according to a preferred embodiment of the present invention preferably includes the tracking controller according to any of various preferred embodiments of the present invention described above.

A tracking control method according to a preferred embodiment of the present invention is a method for controlling a light beam such that the focal point of the light beam is located right on a target track on a storage medium by detecting how much the focal point has shifted from the target track. The method preferably includes the steps of: calculating a first gain of a tracking control loop at an arbitrary frequency when the focal point of the light beam is located on a recorded area of the storage medium on which data has already been written; calculating a second gain of the tracking control loop at the arbitrary frequency when the focal point of the light beam is located on an unrecorded area of the storage medium on which no data has been written yet; and adjusting the gain of the tracking control loop according to the first and second gains by determining whether the focal point of the light beam is located on the recorded area or on the unrecorded area.

A tracking control method according to another preferred embodiment of the present invention is a method for controlling a light beam such that the focal point of the light beam is located right on a target track on a storage medium by detecting how much the focal point has shifted from the target track. The method preferably includes the steps of: calculating a first gain of a tracking control loop at an arbitrary frequency when the focal point of the light beam is located on a recorded area of the storage medium on which data has already been written; calculating a second gain of the tracking control loop at the arbitrary frequency when the focal point of the light beam is located on an unrecorded area of the storage medium on which no data has been written yet; and adjusting the gain of the tracking control loop according to the first and second gains by determining whether or not data is being written on the storage medium.

In one preferred embodiment of the present invention, the tracking control method may further include the step of determining, by the intensity of the light beam that has been reflected from, or transmitted through, the storage medium, whether the focal point of the light beam is located on the recorded area or on the unrecorded area.

In another preferred embodiment, the tracking control method may further include the step of turning the unrecorded area into the recorded area by writing data on the unrecorded area.

In an alternative preferred embodiment, the tracking control method may further include the step of turning the recorded area into the unrecorded area by erasing data from the recorded area.

A tracking control method according to yet another preferred embodiment of the present invention preferably includes the steps of: generating a tracking error signal that represents how much the focal point of a light beam has shifted from a target track on a storage medium; generating a drive signal in response to the tracking error signal so as to move the light beam such that the focal point of the light beam is located right on the target track; and switching the gain of at least one of the tracking error signal and the drive signal depending on whether or not the focal point of the light beam is located on a recorded area of the storage medium on which data has already been written.

In one preferred embodiment of the present invention, the step of switching the gain may include the step of switching the gain depending on whether or not data is being written on the storage medium.

In an alternative preferred embodiment, the tracking control method may further include the step of detecting the light beam that has been reflected from, or transmitted through, the storage medium and determining, by the light beam detected, whether the focal point of the light beam is located on the recorded area or on an unrecorded area of the storage medium on which no data has been written yet.

A computer readable storage medium according to a preferred embodiment of the present invention has preferably stored thereon a program that is defined so as to get the respective processing steps of the tracking control method executed by a computer.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, preferred embodiments of the present invention will be described with reference to the accompanying drawings.

Embodiment 1

Figure 1:
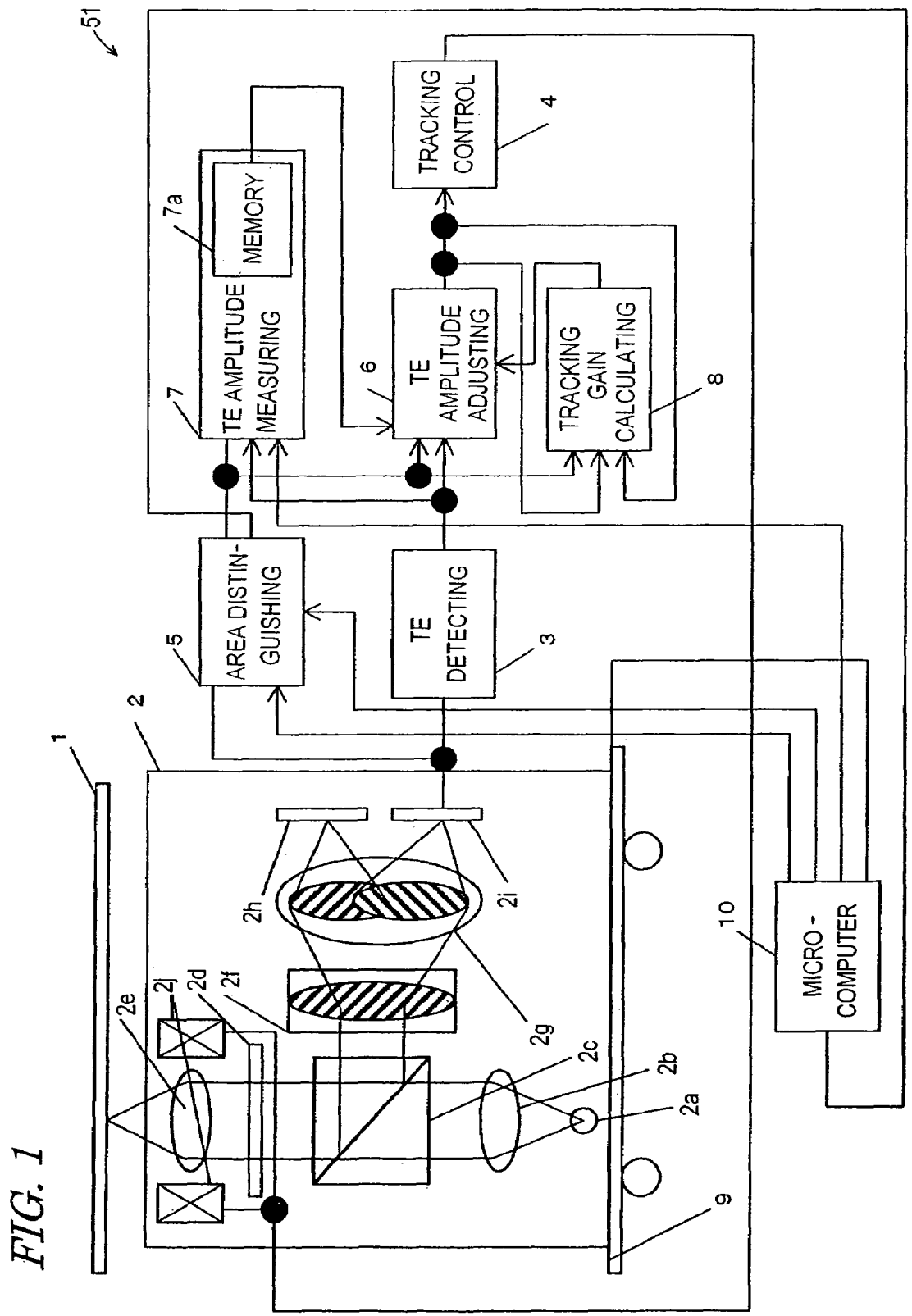
FIG. 1 is a block diagram showing a configuration for a tracking controller according to a first specific preferred embodiment of the present invention.

FIG. 1 shows a configuration for a tracking controller 51 according to a first specific preferred embodiment of the present invention. The tracking controller 51 shown in FIG. 1 is preferably used in a system for reading or writing data from/on a storage medium by means of a light beam (e.g., an optical disc drive). In the following example, the storage medium 1 is a DVD-R. Alternatively, the storage medium 1 may also be a DVD-RW, a CD-R, a CD-RW or any other rewritable or recordable high-density storage medium. The tracking controller 51 includes an optical head 2. As shown in FIG. 1, the optical head 2 preferably includes a semiconductor laser diode 2a (which emits a laser beam with a wavelength of about 650 nm, for example), a collimator lens 2b, a polarization beam splitter 2c, a wave plate 2d, a convergent lens 2e, a photo-detecting hologram 2f, a detector lens 2g, a plus-first-order photodetector 2h, a minus-first-order photodetector 2i and a tracking coil 2j. It should be noted that the wavelength of the laser beam to be emitted from the semiconductor laser diode 2a does not have to be about 650 nm but may be appropriately defined according to the type of the storage medium selected. Also, the other optical members are preferably appropriately selected so as to match the laser beam that has been emitted from the semiconductor laser diode 2a.

The light beam that has been emitted from the semiconductor laser diode 2a is collimated by the collimator lens 2b into a parallel beam, which is passed through the polarization beam splitter 2c and the wave plate 2d and then focused by the convergent lens 2e onto the data storage layer of the disc 1.

The focused beam is reflected back from the data storage layer and then passes the same convergent lens 2e and wave plate 2d again following the same optical path. Although the data stored on the data storage layer are read out by using the reflected light beam, the data can be read out using a transmitted light beam in the case where the optical disc is transparent. Thereafter, the reflected light beam is split by the polarization beam splitter 2c into two, one of which is separated from the original optical path so as to be incident onto the photo-detecting hologram 2f. On receiving the separated light beam, the photo-detecting hologram 2f diffracts the light beam by splitting it into a tracking-error-detecting minus-first-order light beam and a focus-error-detecting plus-first-order light beam. Subsequently, the tracking-error-detecting minus-first-order light beam and the focus-error-detecting plus-first-order light beam are incident onto the minus-first-order photodetector 2i and the plus-first-order photodetector 2h, respectively, and then converted into electric signals.

The output of the plus-first-order photodetector 2h is a focus error signal representing the focusing state of the light beam on the data storage layer of the disc 1. The position of the convergent lens 2e is controlled by a known method such that the focus error signal equals zero.

Figure 16:
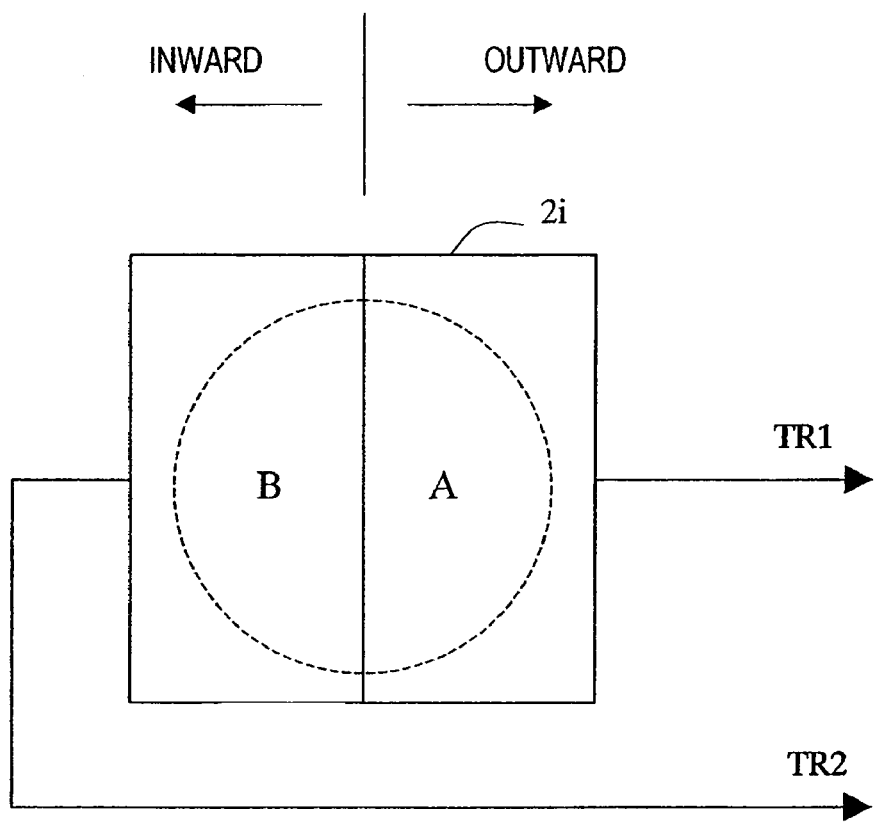
FIG. 16 is a diagram schematically showing a photodetector.
Figure 17A:
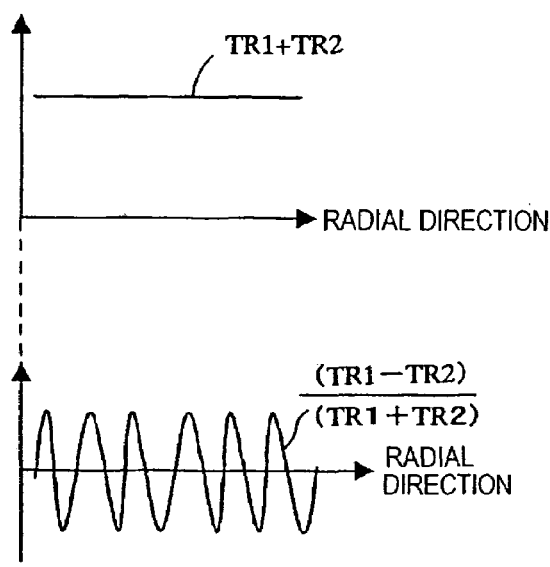
FIGS. 17A and 17B show amplitudes of tracking error signals obtained from an unrecorded area and a recorded area, respectively.
Figure 17B:
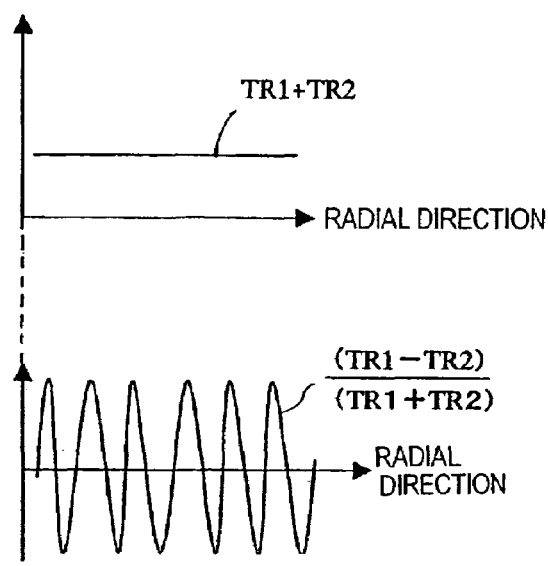

The minus-first-order photodetector 2i includes two divided detecting areas A and B as shown in FIG. 16. The direction in which the boundary between these two detecting areas A and B extends corresponds with the direction in which the tracking-error-detecting minus-first-order light beam follows the tracks on the disc (i.e., the tracking direction). That is to say, a light beam that has been reflected from an outside portion of a track enters the detecting area A, while a light beam that has been reflected from an inside portion of the track enters the detecting area B. Then, the tracking-error-detecting minus-first-order light beams that have been detected at the detecting areas A and B are converted into electric signals, which are output as signals TR1 and TR2 to a tracking error detecting section 3. Optionally, the minus-first-order photodetector 2i may be divided into four detecting areas.

As shown in FIG. 1, the tracking controller 51 further includes an area distinguishing section 5, the tracking error detecting section 3, a tracking error amplitude measuring section 7, a tracking error amplitude adjusting section 6, a tracking gain calculating section 8 and a tracking control section 4. The tracking controller 51 further includes a microcomputer 10 that controls all of these sections.

The output signals of the minus-first-order photodetector 2i are supplied to the tracking error detecting section 3 and the area distinguishing section 5. The tracking error detecting section 3 generates a tracking error signal from the output signals TR1 and TR2 of the minus-first-order photodetector 2i by a push-pull method. Also, the tracking error detecting section 3 normalizes the tracking error, detected by the push-pull method, with (TR1+TR2), i.e., the sum of the output signals of the minus-first-order photodetector 2i. Accordingly, the tracking error signal (hereinafter, referred to as "TE signal"), which is the output signal of the tracking error detecting section 3 and represents how much the focal point of the light beam has shifted from the target track on the disc, is given by the following Equation (1):

$$TE=(TR1-TR2)/(TR1+TR2) \tag{1}$$

The area distinguishing section 5 compares the output signal of the minus-first-order photodetector 2i with a predetermined area distinction value C1, thereby judging whether the focal point of the light beam on the disc 1 is located on an information recorded area of the disc 1 or on an information unrecorded area thereof. Also, the area distinguishing section 5 outputs the result of judgment (which will be referred to herein as a "JDG signal") as an H-level or L-level logical signal to the -tracking error amplitude measuring section 7 and the tracking error amplitude adjusting section 6.

Figure 2:
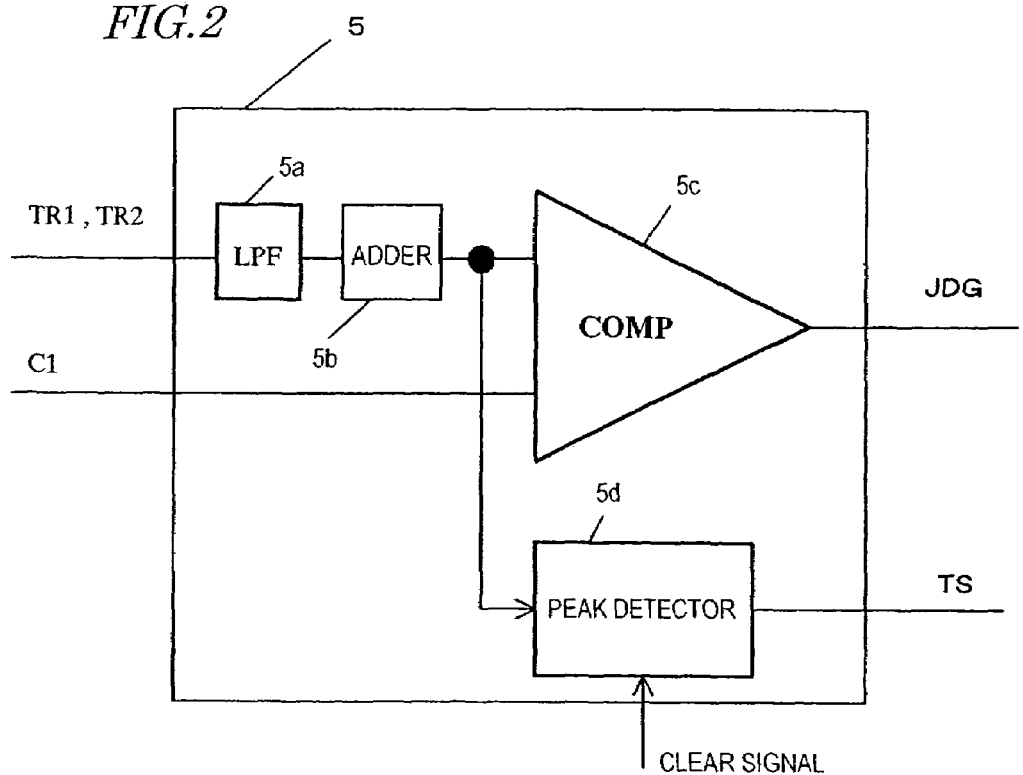
FIG. 2 is a block diagram showing a detailed configuration for the area distinguishing section of the tracking controller shown in FIG. 1.

FIG. 2 is a block diagram showing a configuration for the area distinguishing section 5. As shown in FIG. 2, the area distinguishing section 5 includes a low pass filter (LPF) 5a, an adder 5b, a comparator 5c and a peak detector 5d. The area distinguishing section 5 receives three input signals and delivers two output signals. Specifically, the area distinguishing section 5 receives, as the three input signals, the output signals TR1 and TR2 of the minus-first-order photodetector 2i and the predetermined area distinction value C1 supplied from the microcomputer 10. The low pass filter 5a filters out the high-frequency components of the output signals TR1 and TR2 as noise. On receiving the noise-reduced output signals TR1 and TR2, the adder 5b adds these two signals together and outputs the sum to the comparator 5c. The predetermined area distinction value C1, supplied from the microcomputer 10, is also input to the comparator 5c. The comparator 5c compares the output of the adder 5b with the predetermined area distinction value C1. If the output of the adder 5b is found greater than the predetermined area distinction value C1, then the comparator 5c outputs an H-level signal. Conversely, if the output of the adder 5b is found smaller than the predetermined area distinction value C1, then the comparator 5c outputs an L-level signal. It will be described in detail later how to define the predetermined area distinction value C1 that is output from the microcomputer 10 to the area distinguishing section 5. The peak detector 5d receives the output of the adder 5b and a clear signal supplied from the microcomputer 10, detects the peak value of the outputs of the adder 5b that have been received between two consecutive clear signals, and outputs the peak value to the microcomputer 10.

The tracking error amplitude measuring section 7 measures the amplitude of the TE signal by the peak and bottom values of the TE signal in a predetermined period, and then stores the amplitude of the TE signal on its internal memory 7a. Also, in accordance with the output of the area distinguishing section 5, the tracking error amplitude measuring section 7 measures the amplitude of the TE signal in a period during which the light beam emitted from the optical head 2 is focused in a recorded area and that of the TE signal in a period during which the light beam is focused in an unrecorded area thereof, and stores those amplitudes on the internal memory 7a thereof.

Figure 3:
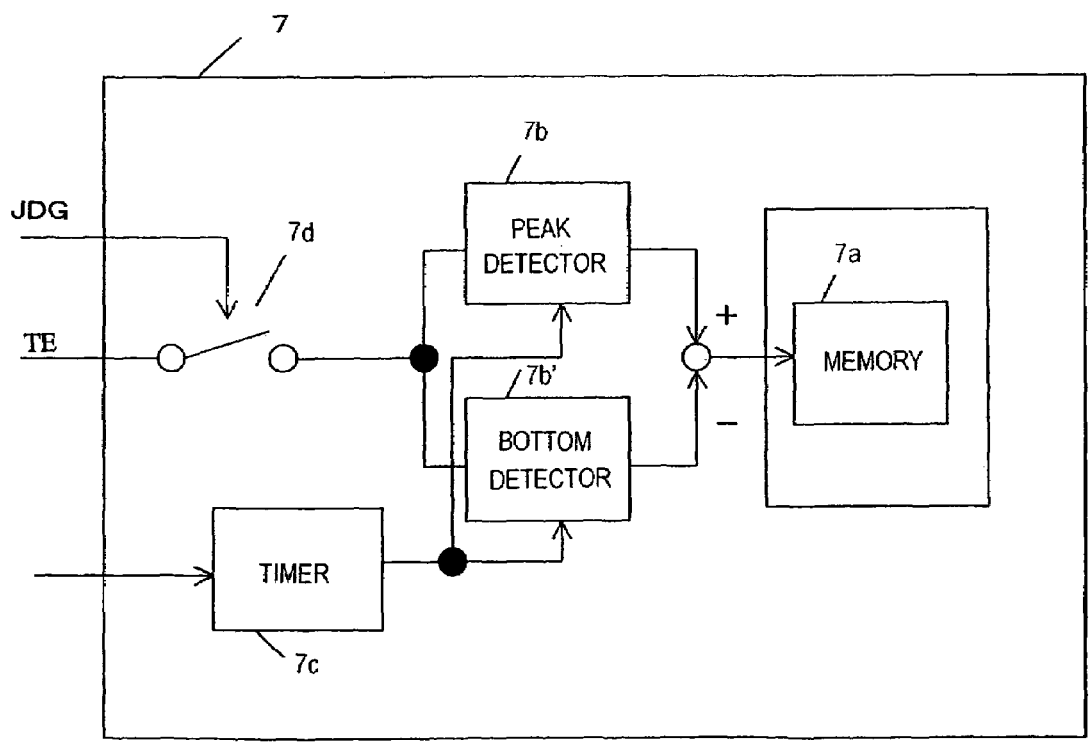
FIG. 3 is a block diagram showing a detailed configuration for the tracking error amplitude measuring section of the tracking controller shown in FIG. 1.

FIG. 3 is a block diagram showing a configuration for the tracking error amplitude measuring section 7. As shown in FIG. 3, the tracking error amplitude measuring section 7 includes the memory 7a, a peak detector 7b, a bottom detector 7b', a timer 7c and a switch 7d.

The tracking error amplitude measuring section 7 receives the JDG signal from the area distinguishing section 5 and the TE signal from the tracking error detecting section 3, respectively. The opening and closing states of the switch 7d are controlled in response to the JDG signal. Specifically, the switch 7d is designed so as to be closed when the focal point of the light beam is located on a recorded area of the disc (i.e., if the JDG signal is low). When the JDG signal is low, the TE signal is input to the peak detector 7b and the bottom detector 7b'. In response to the output of the timer 7c, the peak detector 7b and the bottom detector 7b' detect the peak and bottom values of the TE signal in a predetermined period. On receiving a measuring start signal from the microcomputer 10, the timer 7c starts clocking the predetermined period and instructs the peak and bottom detectors 7b and 7b' when to detect the peak and bottom values. The amplitude of the TE signal when the JDG signal is low is measured by the peak and bottom values that have been detected by the peak and bottom detectors 7b and 7b', and is output to, and stored on, the memory 7a.

Figure 4:
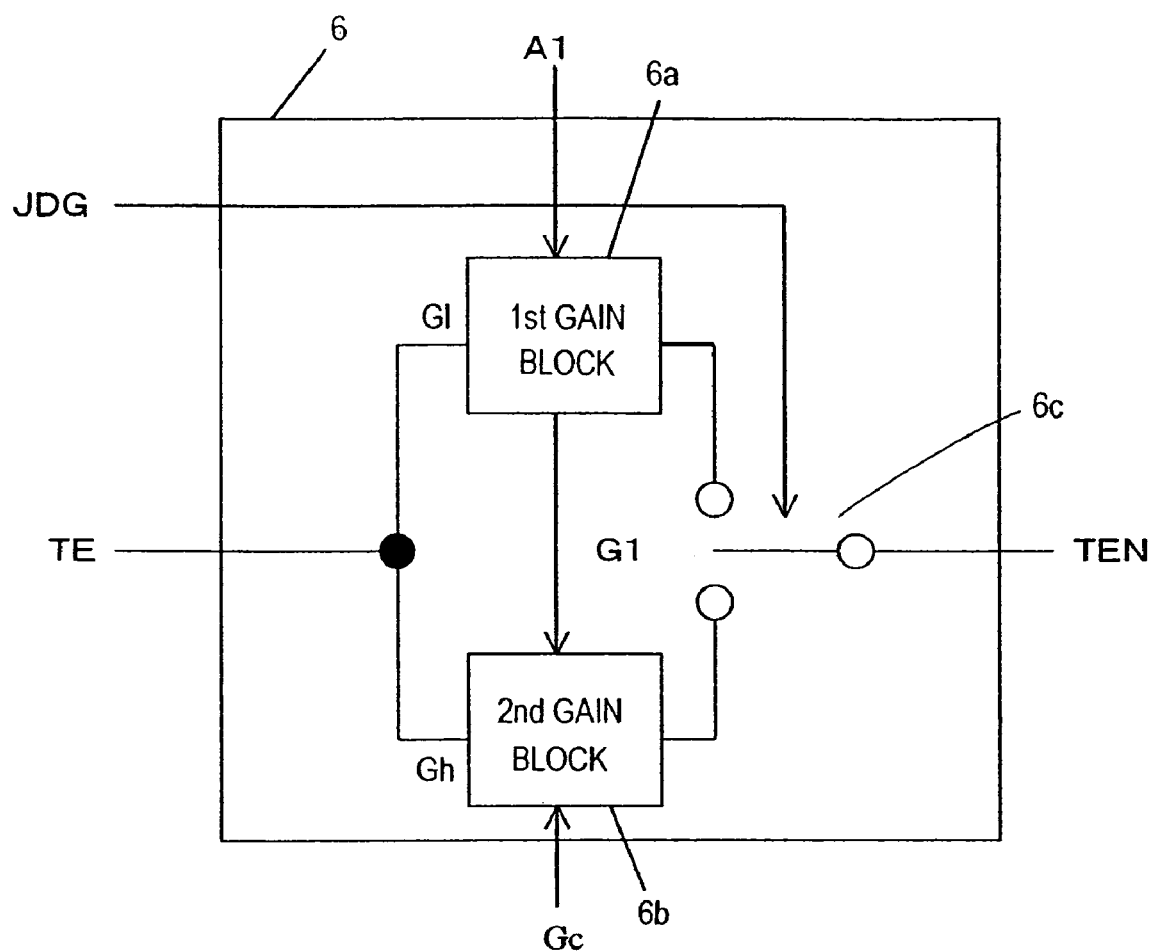
FIG. 4 is a block diagram showing a detailed configuration for the tracking error amplitude adjusting section of the tracking controller shown in FIG. 1.

The tracking error amplitude adjusting section 6 receives the TE signal from the tracking error detecting section 3 and the JDG signal from the area distinguishing section 5, respectively, and adjusts the gain of the tracking control loop to a substantially constant value, no matter whether the focal point of the light beam on the disc 1 is located on a recorded area or on an unrecorded area thereof. Specifically, as shown in FIG. 4, the tracking error amplitude adjusting section 6 includes a first gain block 6a, a second gain block 6b and a switch 6c.

The first gain block 6a receives the TE signal from the tracking error detecting section 3 and a TE signal measured amplitude A1 from the memory 7a of the tracking error amplitude measuring section 7, respectively. The first gain block 6a calculates a gain G1 as a first tracking adjusting signal such that the output TEN of the tracking error amplitude adjusting section 6 equals a predetermined value AN, and multiplies the TE signal by the gain G1. The gain G1 is obtained by the following Equation (2):

$$G1=AN/A1 \tag{2}$$

On the other hand, the second gain block 6b receives the TE signal from the tracking error detecting section 3, the gain G1 from the first gain block 6a, and a proportionality constant Gc from the microcomputer 10, respectively. The proportionality constant Gc is a correction gain for use to make an interpolation on the difference in the amplitude of the TE signal, which is caused depending on whether the focal point of the light beam on the disc 1 is located on a recorded area or on an unrecorded area, i.e., the difference between the gains of the tracking control loop. The second gain block 6b multiplies the TE signal by the gain G1 and the proportionality constant Gc. It will be described in detail later how to define the proportionality constant Gc.

In the tracking error amplitude adjusting section 6 of this preferred embodiment, the gain G1 is output from the first gain block 6a to the second gain block 6b. Alternatively, the second gain block 6b may receive the TE signal measured amplitude A1 from the internal memory 7a of the tracking error amplitude measuring section 7 and may calculate the gain G1 by Equation (2). Even so, the same effects are also achieved.

The outputs of the first and second gain blocks 6a and 6b are passed to the switch 6c. The switch 6c receives two input signals and delivers one output signal and its opening and closing states are controlled by the JDG signal. Specifically, if the focal point of the light beam is located on a recorded area of the disc 1 and the JDG signal is low, then the switch 6c selects the output of the first gain block 6a. As a result, the tracking error amplitude adjusting section 6 delivers the output of the first gain block 6a as the TEN signal. On the other hand, if the JDG signal is high, then the switch 6c selects the output of the second gain block 6b. As a result, the tracking error amplitude adjusting section 6 delivers the output of the second gain block 6b as the TEN signal. That is to say, the tracking error amplitude adjusting section 6 switches the gain of the TE signal by changing the proportional constant to be multiplied the TE signal by in accordance with the position of the focal point of the light beam. In any case, the output of the tracking error amplitude adjusting section 6 is passed to the tracking control section 4.

The tracking gain calculating section 8 calculates the gain of the tracking control loop to minimize the shift of the focal point of the light beam on the disc 1 from the target track on the disc 1. For example, the tracking gain calculating section 8 shown in FIG. 1 adds a disturbance signal having a predetermined frequency f [Hz] to the TEN signal, and measures the amplitude of the TEN signal without the disturbance signal and that of the TEN signal with the disturbance signal, thereby calculating a loop gain at the predetermined frequency f [Hz] based on the amplitude ratio. Also, in response to the JDG signal supplied from the area distinguishing section 5, the tracking gain calculating section 8 calculates an amplitude correction gain Gc from gains G1 and Gh that are associated with the L-level JDG signal and H-level JDG signal, respectively. The amplitude correction gain Gc is given by the following Equation (3):

$$Gc = G1/Gh \qquad (3)$$

Figure 5:
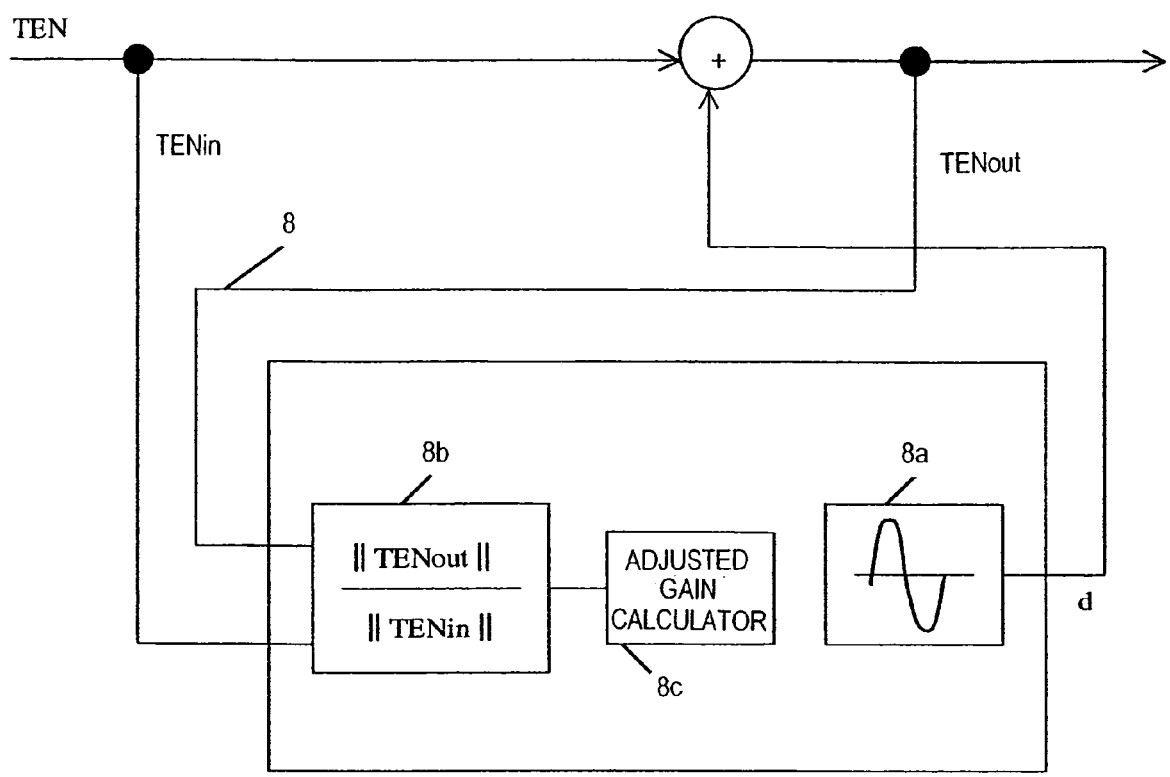
FIG. 5 is a block diagram showing a detailed configuration for the tracking gain calculating section of the tracking controller shown in FIG. 1.

More specifically, the tracking gain calculating section 8 includes an oscillator 8a, a gain calculator 8b and an adjusted gain calculator 8c as shown in FIG. 5. In calculating the gain of the tracking control loop, the oscillator 8a adds a sine wave d, having an arbitrary frequency and an arbitrary amplitude, to the TEN signal, which is the output of the tracking error amplitude adjusting section 6. While the oscillator 8a is adding the sine wave d to the TEN signal, the gain calculator 8b obtains an integral of the absolute values (i.e., the amplitude) of the TEN signal ($\|TEN_{in}\|$ shown in FIG. 5) and an integral of the absolute values (i.e., the amplitude) of the sums of the TEN signals and the outputs of the oscillator 8a ($\|TEN_{out}\|$ shown in FIG. 5). Then, the gain calculator 8b calculates the gain of the tracking control loop as the ratio of the latter integral to the former integral and outputs the gain obtained to the adjusted gain calculator 8c. In response to the JDG signal supplied from the area distinguishing section 5, the adjusted gain calculator 8c stores the output of the gain calculator 8b, calculates the ratio of the gain G1 of the tracking control loop for a recorded area to the gain Gh of the tracking control loop for an unrecorded area as the proportionality constant Gc by Equation (3), and outputs it to the tracking error amplitude adjusting section 6.

Next, the tracking control section 4 subjects the TE signal to phase compensation, transforms its signal intensity into a variation in current, and supplies the current to the tracking coil 2j as a drive signal. In accordance with the output of the tracking control section 4, the tracking coil 2j drives the convergent lens 2e in the disc radial direction. In this manner, the convergent lens 2e moves so that the focal point of the light beam located right on the target track of the disc, whereby the light beam can be controlled so as not to lose tracks.

In accordance with a track jump instruction from the microcomputer 10, the transport stage 9 controls a move of the optical head 2 in the disc radial direction if the move is too big for the tracking coil 2j to cope with. For example, to move the optical head 2 to right under a predetermined track, the optical head 2 is roughly moved first by the transport stage 9 to around the predetermined track and then precisely controlled by the tracking coil 2j so as to catch and keep that track.

Figure 6A:
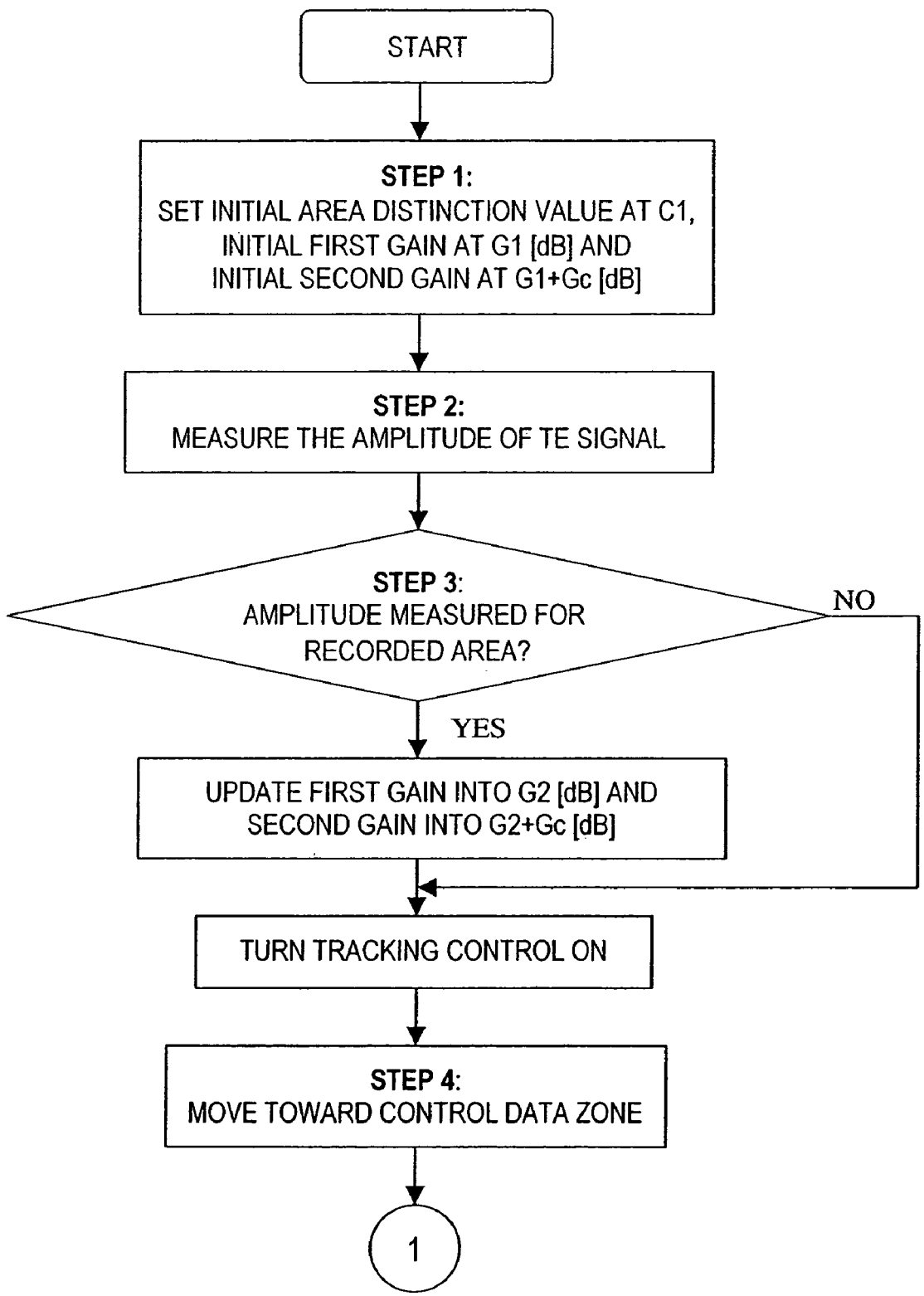
FIGS. 6A and 6B are a flowchart showing a sequence of operations of the tracking controller shown in FIG. 1.
Figure 6B:
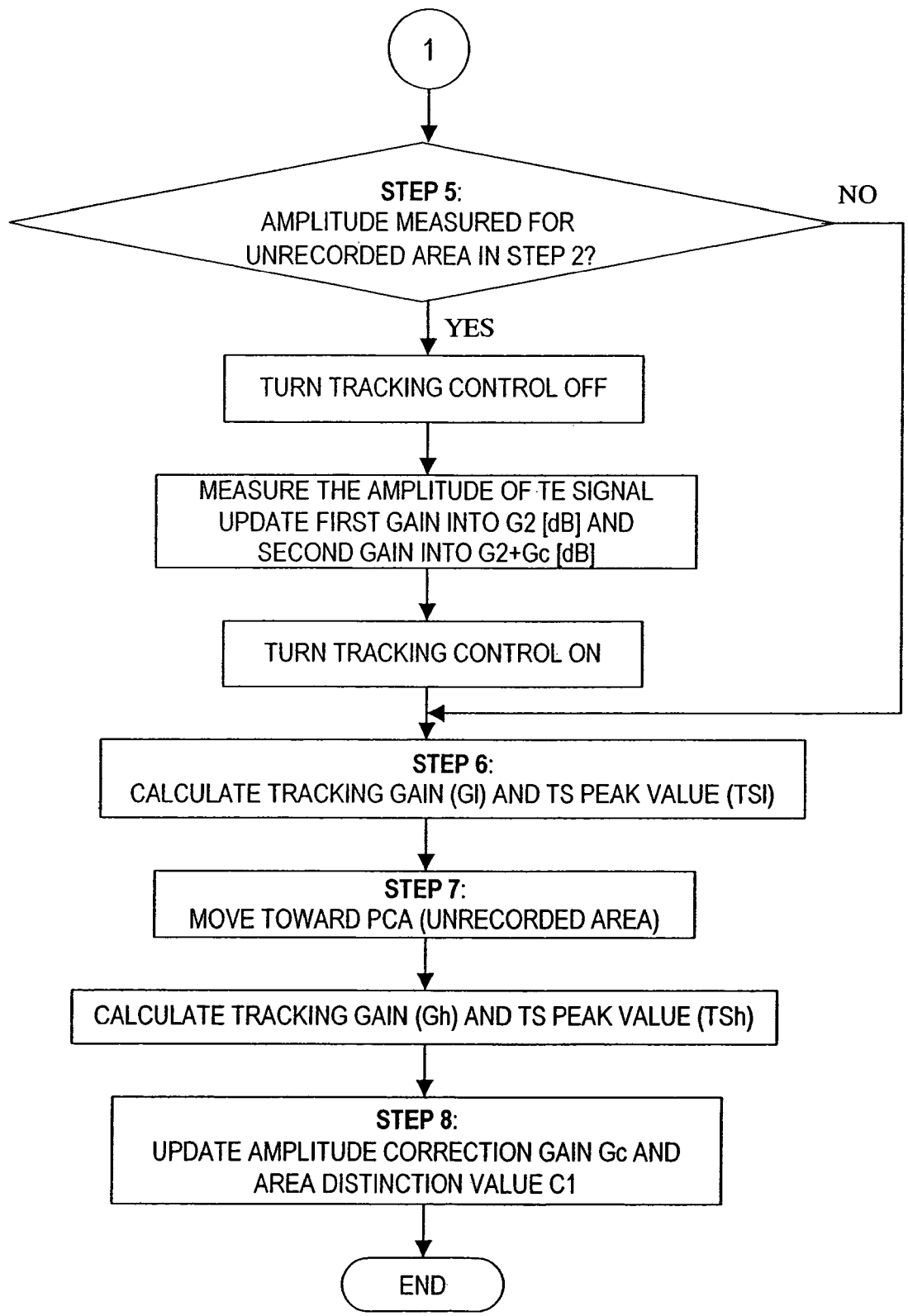

Hereinafter, a sequence of operations of the tracking controller 51 of this preferred embodiment will be described with reference to the flowchart shown in FIGS. 6A and 6B. A control procedure that is defined so as to execute the following sequence of operations may be stored as computer-readable program or firmware in a DSP, an EEPROM or a RAM, for example.

It should be noted that at the beginning of this tracking control operation (i.e., at the "START" shown in FIG. 6A), a focus control is ON such that the light beam emitted from the semiconductor laser diode 2a is focused on an arbitrary location on the data storage layer of the disc 1.

More specifically, the focused beam is reflected back from the data storage layer and then passes the same convergent lens 2e and wave plate 2d again following the same optical path. Thereafter, the reflected light beam is split by the polarization beam splitter 2c into two, one of which is separated from the original optical path so as to be incident onto the photo-detecting hologram 2f. On receiving the separated light beam, the photo-detecting hologram 2f diffracts the light beam by splitting it into a tracking-error-detecting minus-first-order light beam and a focus-error-detecting plus-first-order light beam. Subsequently, the plus-first-order photodetector 2h transforms the focus-error-detecting plus-first-order light beam into an electric signal and outputs the electric signal. A focus error signal, representing a focusing state, is generated from the output of the plus-first-order photodetector 2h and is subjected to focus phase compensation such that the focus error signal equals a predetermined value. By driving the convergent lens 2e perpendicularly to the data storage layer of the disc 1 using this signal, a focus control can be carried out.

On the other hand, the minus-first-order photodetector 2i transforms the tracking-error-detecting minus-first-order light beam into an electric signal and outputs it to the tracking error detecting section 3 and area distinguishing section 5. In accordance with the output of the minus-first-order photodetector 2i, the tracking error detecting section 3 generates a tracking error signal that represents how much a light beam spot has shifted from the center of the target track on the disc 1.

In such a focus controlled state, first, the microcomputer 10 outputs the area distinction value C1 to the area distinguishing section 5 in Step 1. Also, in Step 1, the tracking error amplitude adjusting section 6 defines initial gains G1 and G1+Gc for the first and second gain blocks 6a and 6b.

The outputs of the peak detector 5d for a recorded area and an unrecorded area of the DVD-R disc are preferably obtained in advance and the initial value of the area distinction value C1 to be supplied from the microcomputer 10 to the area distinguishing section 5 is preferably defined as an intermediate value between these two values. Then, the initial area distinction value C1 ensures good reliability.

In the area distinguishing section 5, the signals TR1 and TR2 have their noise removed by the low pass filter 5a and then the noise-reduced signals TR1 and TR2 are added together by the adder 5b to produce a sum signal as described above. When the area distinction value C1 is defined by the microcomputer 10, the comparator 5c compares the sum signal with the area distinction value C1, thereby outputting a digital JDG signal with the H- or L-level from the area distinguishing section 5. Also, the gains G1 and G1+Gc are respectively defined for the first and second gain blocks 6a and 6b of the tracking error amplitude adjusting section 6. Depending on whether the focal point of the outgoing light beam is located on a recorded area of the disc 1 or in an unrecorded area thereof, the area distinguishing section 5 outputs either an H-level JDG signal or an L-level JDG signal. The tracking error amplitude adjusting section 6 multiplies the TE signal, supplied from the tracking error detecting section 3, either by the gain G1 or the gain G1+Gc. Specifically, if the JDG signal is low, then the tracking error amplitude adjusting section 6 outputs the product of the TE signal and the gain G1 as the TEN signal. On the other hand, if the JDG signal is high, then the tracking error amplitude adjusting section 6 outputs the product of the TE signal and the gain G1+Gc as the TEN signal. At this point in time, however, the gain G1 or G1+Gc in the tracking error amplitude adjusting section 6 is still an initial value. Accordingly, the output TEN signal of the tracking error amplitude adjusting section 6 does not always have the desired amplitude.

Next, in Step 2, the tracking error amplitude measuring section 7 measures the amplitude of the TE signal. Specifically, in accordance with the JDG signal, the tracking error amplitude measuring section 7 measures the amplitude of the TE signal when the focal point of the outgoing light beam is located on a recorded area of the disc 1 (i.e., while the JDG signal is low). The amplitude measured is stored on the memory 7a of the tracking error amplitude measuring section 7.

Subsequently, in Step 3, it is determined whether or not the amplitude of the TE signal was measured for a recorded area of the disc 1. This decision can be made by judging whether or not the amplitude is stored on the memory 7a of the tracking error amplitude measuring section 7 as a result of the previous Step 2. If the amplitude was not measured for the recorded area, then no amplitude will be stored on the memory 7a. In other words, zero will be stored on the memory 7a in that situation. On the other hand, if the previous Step 2 was performed for the recorded area, then the tracking error amplitude adjusting section 6 obtains the measured amplitude A1 from the memory 7a of the tracking error amplitude measuring section 7 and updates the gains G1 and G1+Gc of the first and second gain blocks 6a and 6b into different gains G2 and G2+Gc, respectively. In this case, the gain G1, obtained by Equation (2), is updated into the gain G2. However, if the amplitude of the TE signal was not measured for the recorded area (i.e., if the answer to the query of Step 3 is "NO"), the first and second gains G1 and G1+Gc will not be updated but remain unchanged.

If the amplitude of the TE signal was measured for the recorded area so that the gains of the first and second gain blocks 6a and 6b were updated, then the output TEN signal of the tracking error amplitude adjusting section 6 has its amplitude adjusted into a desired value. Next, the output TEN signal of the tracking error amplitude adjusting section 6 is passed to the tracking control section 4, and subjected to phase compensation there. The output of the tracking control section 4 is supplied as a drive signal to the tracking coil 2j. In accordance with the output of the tracking control section 4, the tracking coil 2j drives the convergent lens 2e. That is to say, the tracking control is turned ON.

Then, the microcomputer 10 outputs a drive signal to the transport stage 9 such that the transport stage 9 moves the optical head 2 inward (i.e., toward the center of the disc 1). After the transport stage 9 has moved the optical head 2 inward, the tracking control section 4 outputs a drive signal to the convergent lens 2e such that the outgoing light beam is focused on the control data zone of the lead-in area of the disc 1. In this manner, the tracking coil 2j drives the convergent lens 2e and the focal point of the outgoing light beam moves to the control data zone in Step 4.

Figure 7:
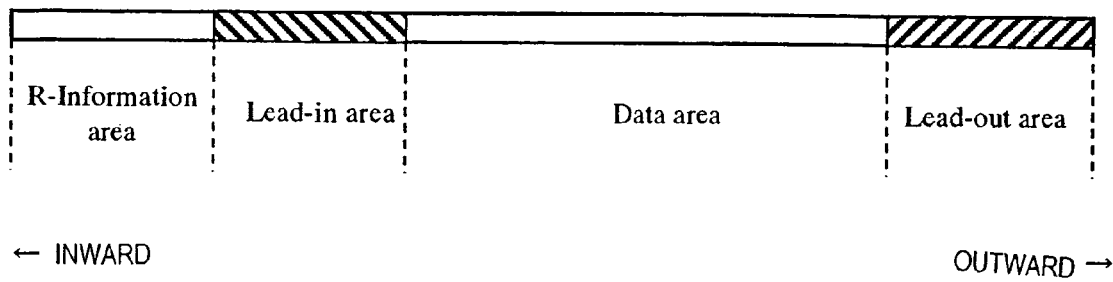
FIG. 7 is a schematic representation showing a sector format structure of a DVD-R disc.

Hereinafter, the sector structure of a DVD-R disc will be described with reference to FIGS. 7 and 8. FIG. 7 shows an arrangement of physical sectors on a DVD-R disc. As shown in FIG. 7, an R-information area, including a power calibration area (PCA) and a recording management area (RMA), is provided as the innermost area that is closest to the center of the disc. The power calibration area is used to adjust the intensity of the light beam, emitted from the semiconductor laser diode 2a, to a preferred level for a data write operation. The recording management area is provided to keep an appropriate management on the recorded data. Every time the intensity of the light beam is adjusted, data is written on a portion of the power calibration area. However, a lot of unrecorded area is still left in the power calibration area. A lead-in area, on which disc ID information and so on are pre-recorded, is provided next to the R-information area as will be described in detail later. The lead-in area is surrounded with a data area to write user data thereon. And a lead-out area is provided as the outermost area to indicate the end of the user data area.

Next, an arrangement of physical sectors on the lead-in area will be described with reference to FIG. 8. FIG. 8 is a schematic representation showing a physical sector structure of a DVD-R disc. In FIG. 8, each hexadecimal number in parentheses indicates the first sector of the zone.

Figure 8:
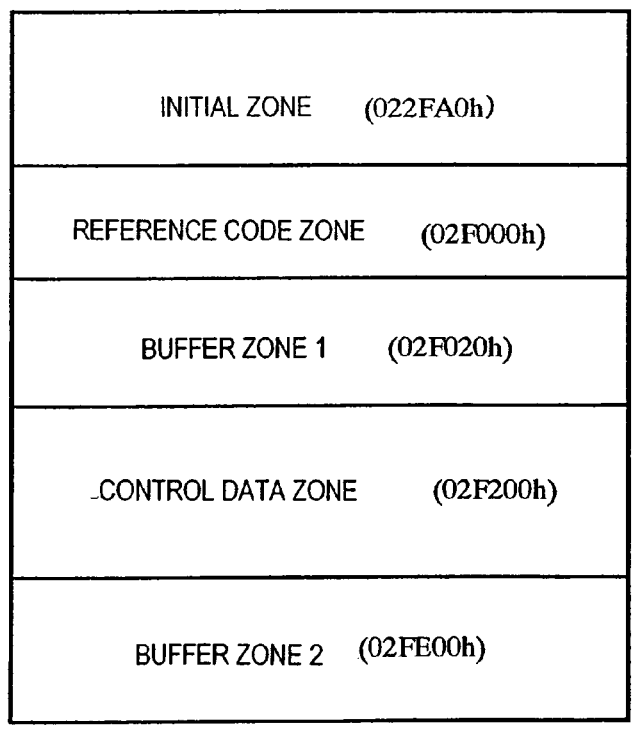
FIG. 8 is a schematic representation showing a sector format structure of the lead-in area of a DVD-R disc.

As shown in FIG. 8, the lead-in area of the DVD-R disc consists of an initial zone, a reference code zone, a first buffer zone, a control data zone and a second buffer zone, which are arranged in this order such that the initial zone is closest to the center of the disc. Of these five zones, the data recorded on the initial zone and first and second buffer zones are all zeros. A signal having a fundamental period is recorded on the reference code zone as a reference signal for use to adjust various parameters for reading or writing data from/on the disc. Disc ID information, including the type of disc, is recorded on the control data zone. That is to say, the control data zone is a recorded area so to speak.

Referring back to FIG. 6B, if the amplitude of the TE signal was not measured for the recorded area in Step 2 (i.e., if the answer to the query of Step 5 is "YES"), then the microcomputer 10 turns the tracking control OFF to make the tracking error amplitude measuring section 7 measure the amplitude of the TE signal. At this point in time, the outgoing light beam is focused on the control data zone, which is a recorded area. Thus, an L-level JDG signal is output from the area distinguishing section 5 and the tracking error amplitude measuring section 7 measures the amplitude of the TE signal. The amplitude measured is stored on the memory 7a of the tracking error amplitude measuring section 7.

The tracking error amplitude adjusting section 6 obtains the measured amplitude A1 from the memory 7a of the tracking error amplitude measuring section 7 and updates the gains G1 and G1+Gc of the first and second gain blocks 6a and 6b into different gains G2 and G2+Gc, respectively. In this case, the gain G1, obtained by Equation (2), is updated into the gain G2. After the first and second gains have been updated in this manner, the tracking control is turned ON again.

However, if the amplitude of the TE signal was measured for the recorded area in Step 2 (i.e., if the answer to the query of Step 5 is "NO"), then the amplitude of the TE signal is not measured for the control data zone.

Next, in Step 6, the tracking gain calculating section 8 calculates the gain of the tracking control loop for the control data zone as a recorded area. As already described with reference to FIG. 5, the oscillator 8a adds a sine wave d, having an arbitrary frequency and an arbitrary amplitude, to the TEN signal, which is the output of the tracking error amplitude adjusting section 6. While the oscillator 8a is adding the sine wave d to the TEN signal, the gain calculator 8b obtains an integral of the absolute values of the TEN signal (i.e., $\|TEN_{in}\|$ shown in FIG. 5) and an integral of the absolute values of the sums of the TEN signals and the outputs of the oscillator 8a (i.e., $\|TEN_{out}\|$ shown in FIG. 5). Then, the gain calculator 8b calculates the gain of the tracking control loop as the ratio of the latter integral to the former integral and outputs the gain obtained to the adjusted gain calculator 8c. Since the JDG signal supplied from the area distinguishing section 5 is low, the adjusted gain calculator 8c stores the output of the gain calculator 8b as the gain G1 of the tracking control loop for the recorded area. However, no gain Gh of the tracking control loop for an unrecorded area is stored, and therefore, the adjusted gain calculator 8c does not calculate the proportionality constant Gc. As a result, the proportionality constant Gc of the tracking error amplitude adjusting section 6 is not updated.

After having calculated the gain of the tracking control loop for the control data zone, the microcomputer 10 outputs a clear signal to the internal peak detector 5d of the area distinguishing section 5. Subsequently, the peak detector 5d detects the peak value of the output signal of the adder 5b. The output of the peak detector 5d is input to the microcomputer 10 again. In this manner, the peak value of the sum (TR1+TR2) of the output signals TR1 and TR2 of the minus-first-order photodetector 2i for the recorded area is stored as TS1 in Step 6.

Thereafter, in Step 7, the microcomputer 10 outputs a drive signal to the transport stage 9 such that the optical head 2 moves inward from the control data zone of the lead-in area. In accordance with the drive signal supplied from the microcomputer 10, the transport stage 9 drives the optical head 2 inward (i.e., toward the center of the disc 1). After the transport stage 9 has moved the optical head 2 inward, the tracking control section 4 outputs a drive signal to the convergent lens 2e such that the outgoing light beam is focused on the power calibration area. In response, the convergent lens 2e moves the focal point of the light beam to the power calibration area of the R-information area by way of the tracking coil 2j.

Next, the tracking gain calculating section 8 calculates the gain of the tracking control loop for the power calibration area as an unrecorded area. As already described with reference to FIG. 5, the oscillator 8a adds a sine wave d, having an arbitrary frequency and an arbitrary amplitude, to the TEN signal, which is the output of the tracking error amplitude adjusting section 6. While the oscillator 8a is adding the sine wave d to the TEN signal, the gain calculator 8b obtains an integral of the absolute values of the TEN signal (i.e., $\|TEN_{in}\|$ shown in FIG. 5) and an integral of the absolute values of the sums of the TEN signals and the outputs of the oscillator 8a (i.e., $\|TEN_{out}\|$ shown in FIG. 5). Then, the gain calculator 8b calculates the gain of the tracking control loop as the ratio of the latter integral to the former integral and outputs the gain obtained to the adjusted gain calculator 8c. Since the JDG signal supplied from the area distinguishing section 5 is high, the adjusted gain calculator 8c stores the output of the gain calculator 8b as the gain Gh of the tracking control loop for the unrecorded area. After having calculated the gain of the tracking control loop for the power calibration area, the microcomputer 10 outputs a clear signal to the internal peak detector 5d of the area distinguishing section 5. Subsequently, the peak detector 5d detects the peak value of the output signal of the adder 5b. The output of the peak detector 5d is input to the microcomputer 10 again. In this manner, the peak value of the sum (TR1+TR2) of the output signals TR1 and TR2 of the minus-first-order photodetector 2i for the unrecorded area is stored as TSh in Step 7.

The tracking gain calculating section 8 calculates the proportionality constant Gc as the ratio of the gain G1 of the tracking control loop for the recorded area to the gain Gh of the tracking control loop for the unrecorded area according to Equation (3), and outputs it to the second gain block 6b of the tracking error amplitude adjusting section 6.

Finally, in Step 8, the microcomputer 10 updates the area distinction value C1 by using the TS peak value TS1 for the recorded area and the TS peak value TSh for the unrecorded area. The new area distinction value C1 is given by the following Equation (4):

$$C1=(TSh+TS1)/2 \qquad (4)$$

Thus, no matter whether the focal point of the light beam on the data storage layer of the disc 1 is located on a data recorded area or a data unrecorded area thereof, the area distinguishing section 5 can always determine accurately whether the beam spot belongs to the recorded area or the unrecorded area. Also, in accordance with the result of judgment made by the area distinguishing section 5, the tracking error amplitude adjusting section 6 can multiply the output of the tracking error detecting section 3 by an appropriate gain. Accordingly, irrespective of the exact location of the focal point on the data storage layer, the signal supplied to the tracking control section 4 can always have an appropriate intensity. As a result, this tracking controller can perform the tracking control operation with high accuracy and stability.

Various alternative methods for calculating the gain of a tracking control loop, other than the method described above, have been proposed and already used actually. For example, the gain of a tracking control loop may be obtained by calculating a tracking control residue while the tracking control loop is closed. Even if the gain of the tracking control loop is calculated by any of those alternative methods when the focal point of the light beam emitted from the optical head is located on a recorded or unrecorded area of the data storage layer of the disc 1, similar effects are also achievable.

Also, in the preferred embodiment described above, the area distinction value C1 is updated by Equation (4). However, similar effects are also achieved even when the area distinction value C1 is an arbitrary value between TSh and TS1 as represented by the following inequality:

$$TSh<C1<TS1$$

Figure 9A:
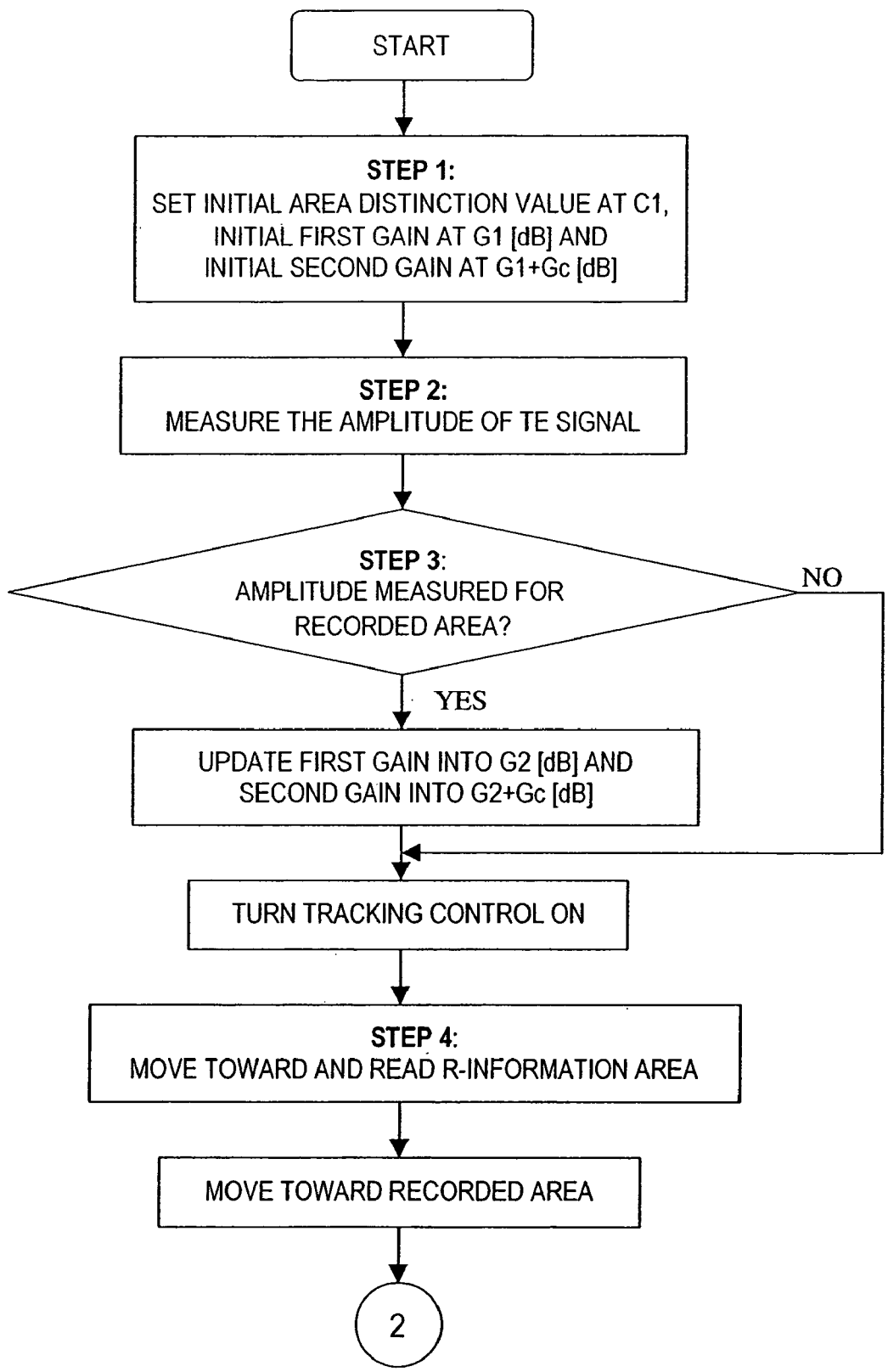
FIGS. 9A and 9B are a flowchart showing another sequence of operations of the tracking controller shown in FIG. 1.
Figure 9B:
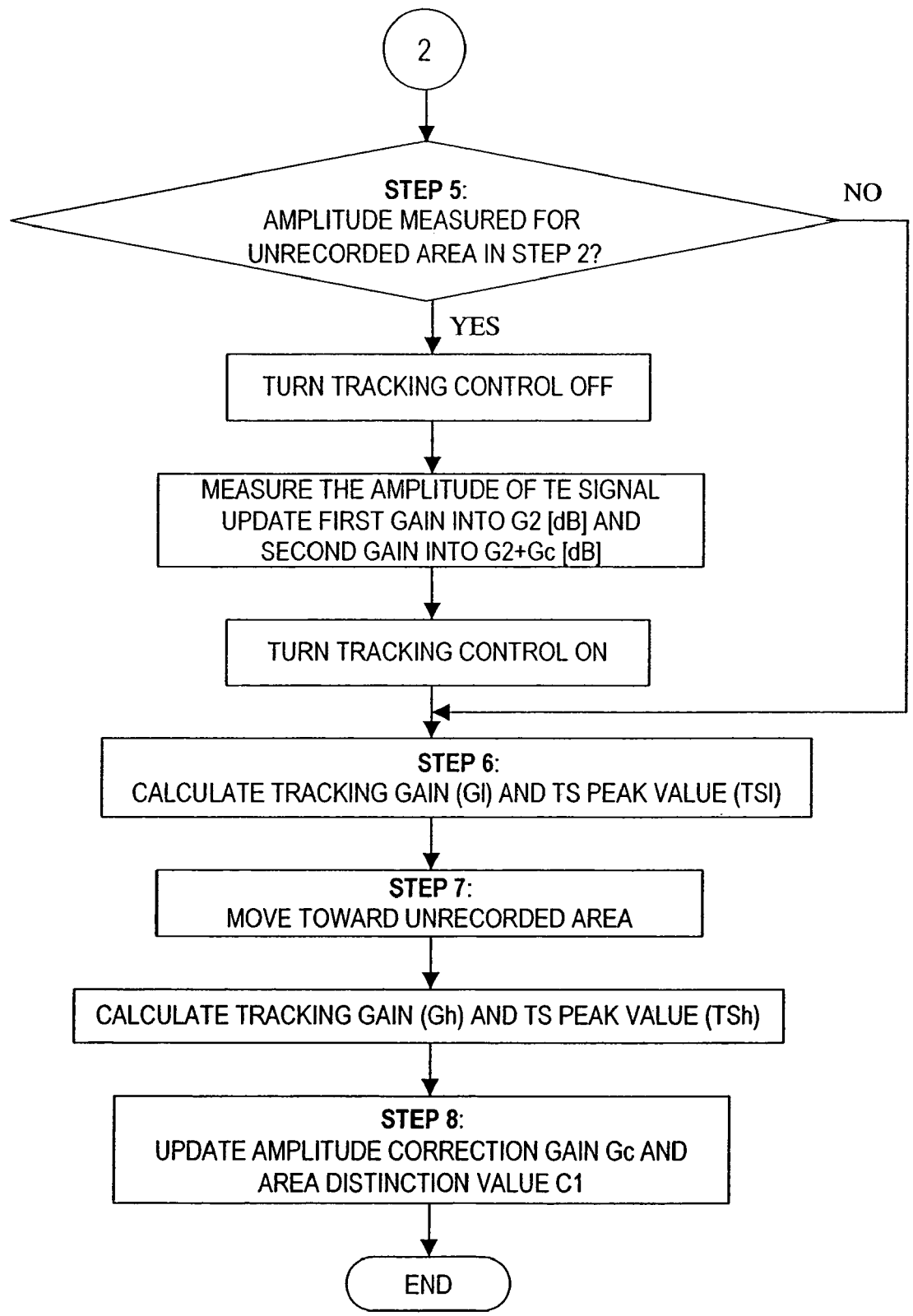

Furthermore, in the preferred embodiment described above, the control data zone is used as the recorded area and the power calibration area is used as the unrecorded area. However, the same effects are also achievable even by performing the sequence of operations shown in FIGS. 9A and 9B. In FIGS. 9A and 9B, the control data zone and power calibration area that are adopted as the recorded and unrecorded areas of the preferred embodiment described above are replaced with a recorded area and an unrecorded area included in the recording management area of the R-information area. For example, in the recording management area, the recorded area is a region where the recording management information for the data recorded on the disc is recorded, and the unrecorded area is a region where the recording management information is not recorded. Specifically, after Steps 1, 2 and 3 have been carried out, the optical head 2 is moved in Step 4 such that the focal point of the outgoing light beam is located on the recorded area of the recording management area as shown in FIG. 9A. Also, in Step 7, the optical head 2 is moved such that the focal point of the outgoing light beam is located on the unrecorded area of the recording management area as shown in FIG. 9B. The other processing steps shown in FIGS. 9A and 9B may be carried out just as already described.

In the preferred embodiment described above, the disc 1 loaded is a DVD-R. Alternatively, a CD-R or a CD-RW may also be loaded instead. In that case, the tracking controller can also be compatible with the CD-R or CD-RW by carrying out the sequence of operations shown in FIGS. 10A and 10B. The sequence of operations shown in FIGS. 10A and 10B corresponds to that shown in FIGS. 6A and 6B. Specifically, when the CD-R or CD-RW is used, the recorded area needs to be searched for in accordance with the information stored on the table of contents (TOC) area and the unrecorded area needs to be constituted by the first or last 30 ATIP frames of the test area of the power calibration area. No information is recorded on those frames such that the first and last 30 ATIP frames are easily detectible as the beginning and end of the test area, respectively. That is to say, those frames are unrecorded areas.

Figure 10A:
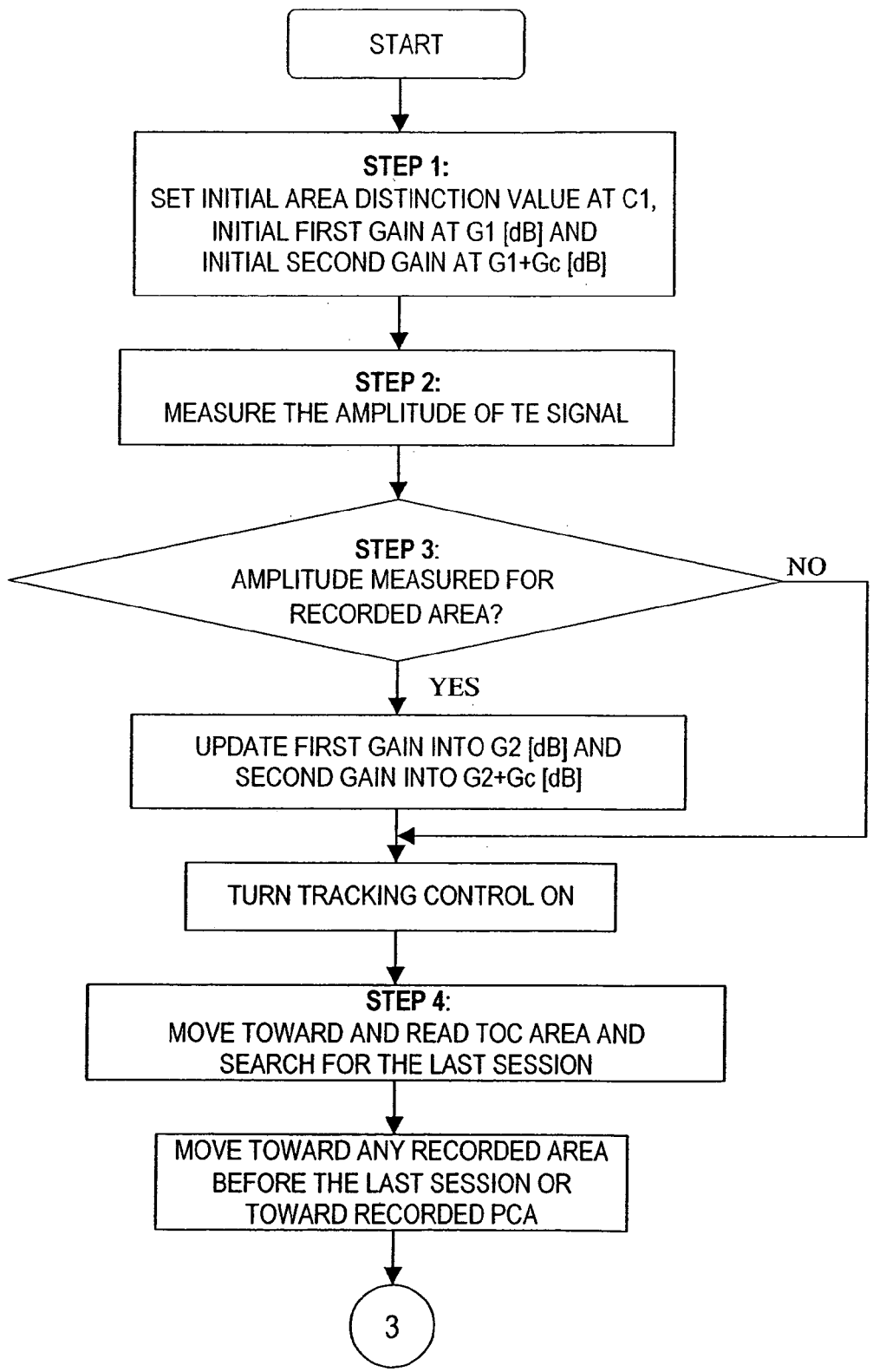
FIGS. 10A and 10B are a flowchart showing still another sequence of operations of the tracking controller shown in FIG. 1.

Specifically, after Steps 1, 2 and 3 have been carried out, the optical head 2 is moved to the TOC area in Step 4 to read the data from the TOC area as shown in FIG. 10A. For example, the last session may be located in this process step. Then, the optical head 2 is moved to such a position that the outgoing light beam is focused on an arbitrary data recorded area before the last session. And Step 5 is carried out at that position. Alternatively, the optical head 2 may also be moved to a recorded portion of the power calibration area.

Figure 10B:
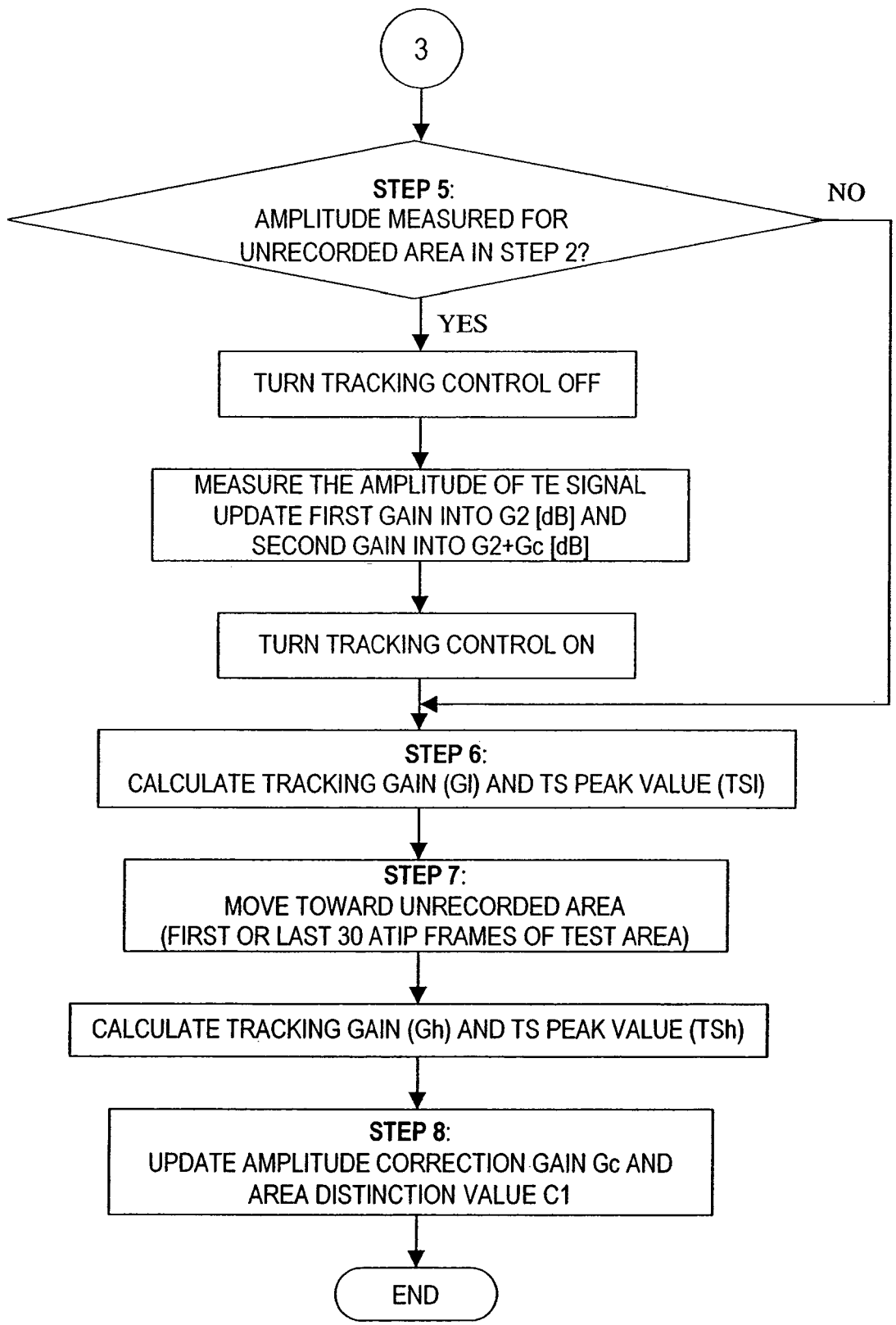

Also, in Step 7, the optical head 2 is moved to the first or last 30 ATIP frames of the test area of the power calibration area as shown in FIG. 10B. The other processing steps shown in FIGS. 10A and 10B may be carried out just as already described. Even so, the same effects are also achievable.

Figure 11A:
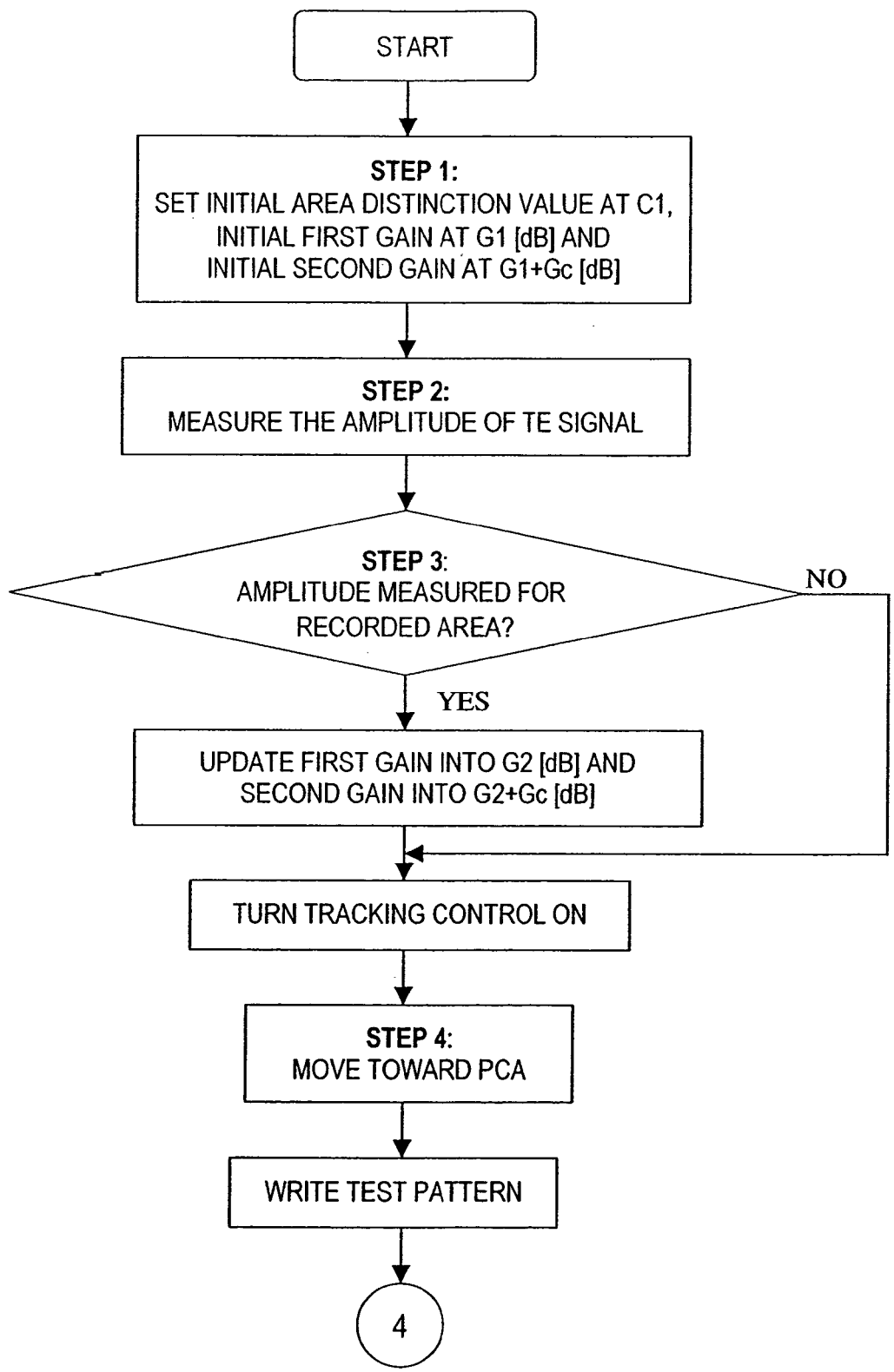
FIGS. 11A and 11B are a flowchart showing yet another sequence of operations of the tracking controller shown in FIG. 1.
Figure 11B:
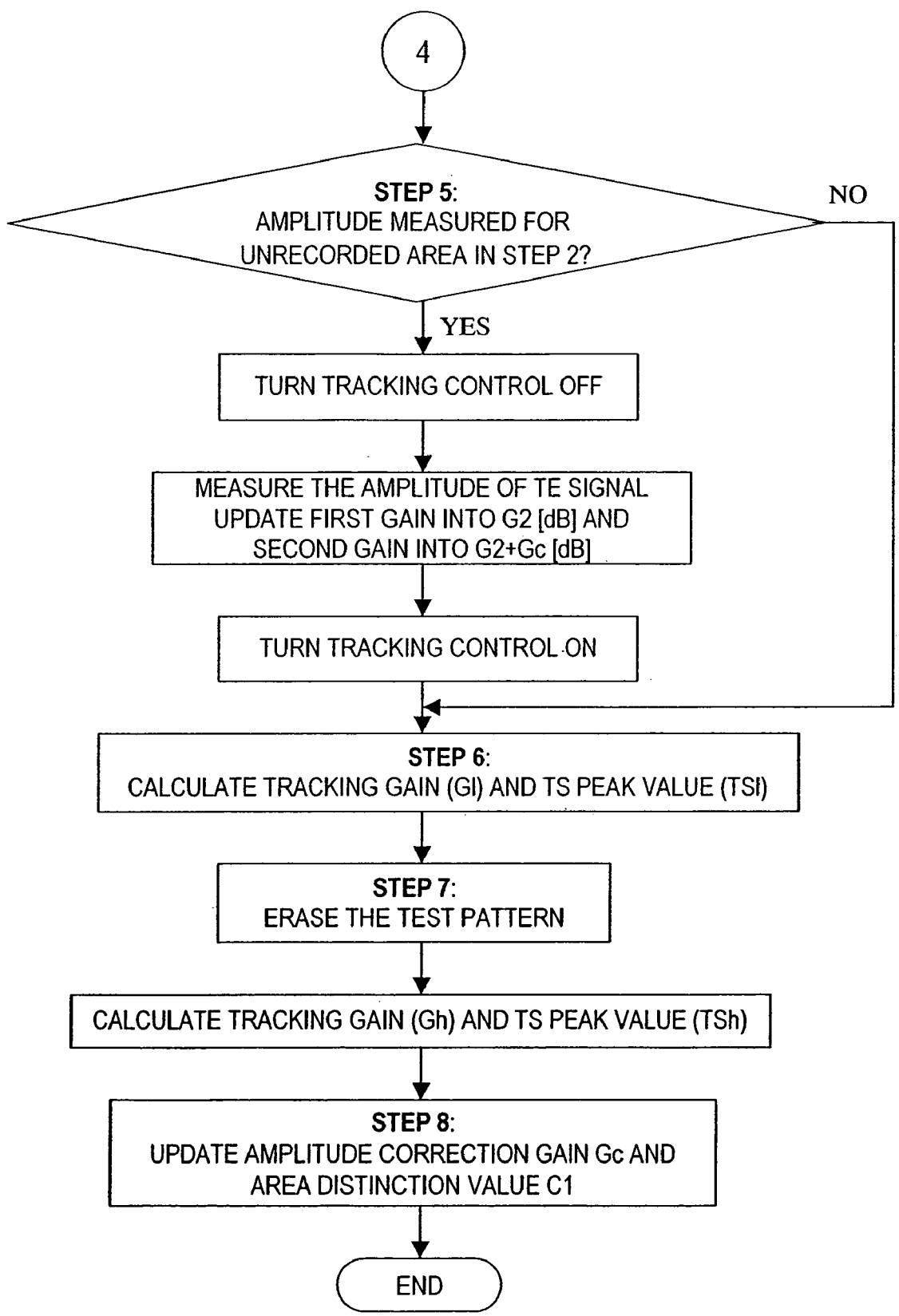

Furthermore, if a DVD-RW has been loaded as the disc 1, then the sequence of operations shown in FIGS. 11A and 11B may be carried out. In that case, after Steps 1, 2 and 3 have been carried out, the optical head 2 is moved to the power calibration area in Step 4 as shown in FIG. 11A. Then, a test pattern is recorded on the power calibration area by irradiating that area with the light beam that has been emitted from the optical head. Thereafter, the amplitude of the TE signal is measured with the test pattern recorded area regarded as the recorded area.

Also, after the tracking gain and the TS peak value have been calculated in Step 6, the test pattern recorded area of the power calibration area is irradiated with the light beam, thereby erasing the test pattern in Step 7. As a result, the test pattern recorded area is turned into an unrecorded area. By using this erased area as an unrecorded area, the tracking gain and the TS peak value are calculated again. Thereafter, by performing the same process steps as those shown in FIG. 6B, the same effects are also achieved.

In the sequence of operations shown in FIGS. 11A and 11B, after Step 3 has been performed, Step 7 may be carried out first, and then Steps 4, 5, 6 and 8 may be performed.

It should be noted that such a method of using the same track as a recorded area and an unrecorded area is applicable for use in not just a DVD-RW but also any other rewritable storage medium compliant with a different standard.

For example, the tracking controller of this preferred embodiment is also compatible with a rewritable high-density storage medium on which data can be written at a higher density than the DVD. The rewritable high-density storage medium disclosed in "Thoroughly Dissecting the next Generation Optical Disc Technology "Blu-ray Disc", Nikkei Electronics, No. 844, pp135-150, (2003), for example, adopts a phase-change recording format and is subjected to a data read or write operation by means of a light beam with a wavelength of about 405 nm. If the storage medium is a disc with a diameter of about 12 cm, the maximum storage capacity of the storage medium is about 27 GB per layer. Also, data can be transferred to/from this storage medium at a transfer rate of 36 Mbps. To adjust the optical power for writing, this rewritable high-density storage medium includes an optimum power control (OPC) area on which a test pattern can be written and a permanent information and control data (PIC) area on which the ID information of the storage medium is recorded.

Figure 12A:
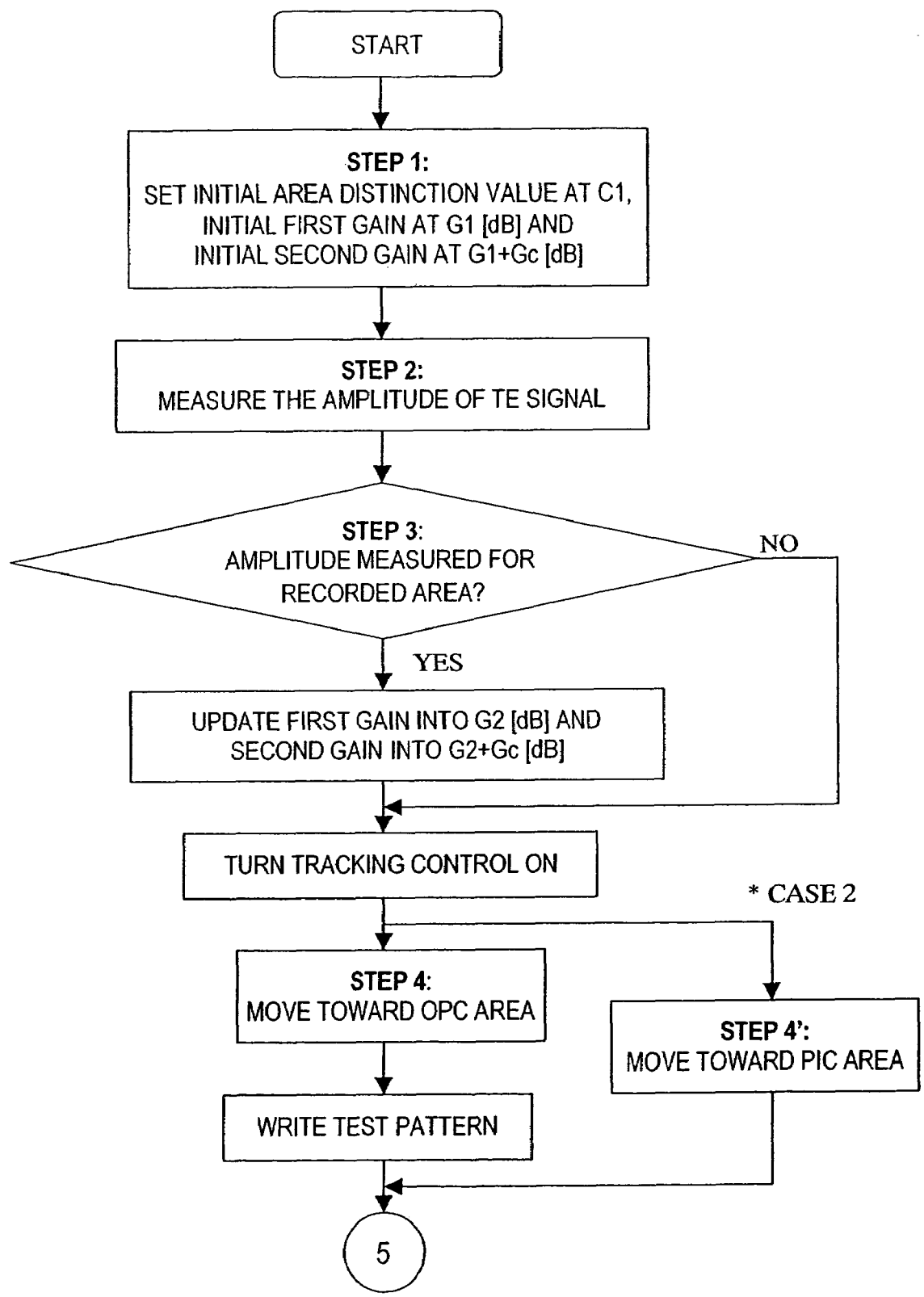
FIGS. 12A and 12B are a flowchart showing yet another sequence of operations of the tracking controller shown in FIG. 1.
Figure 12B:
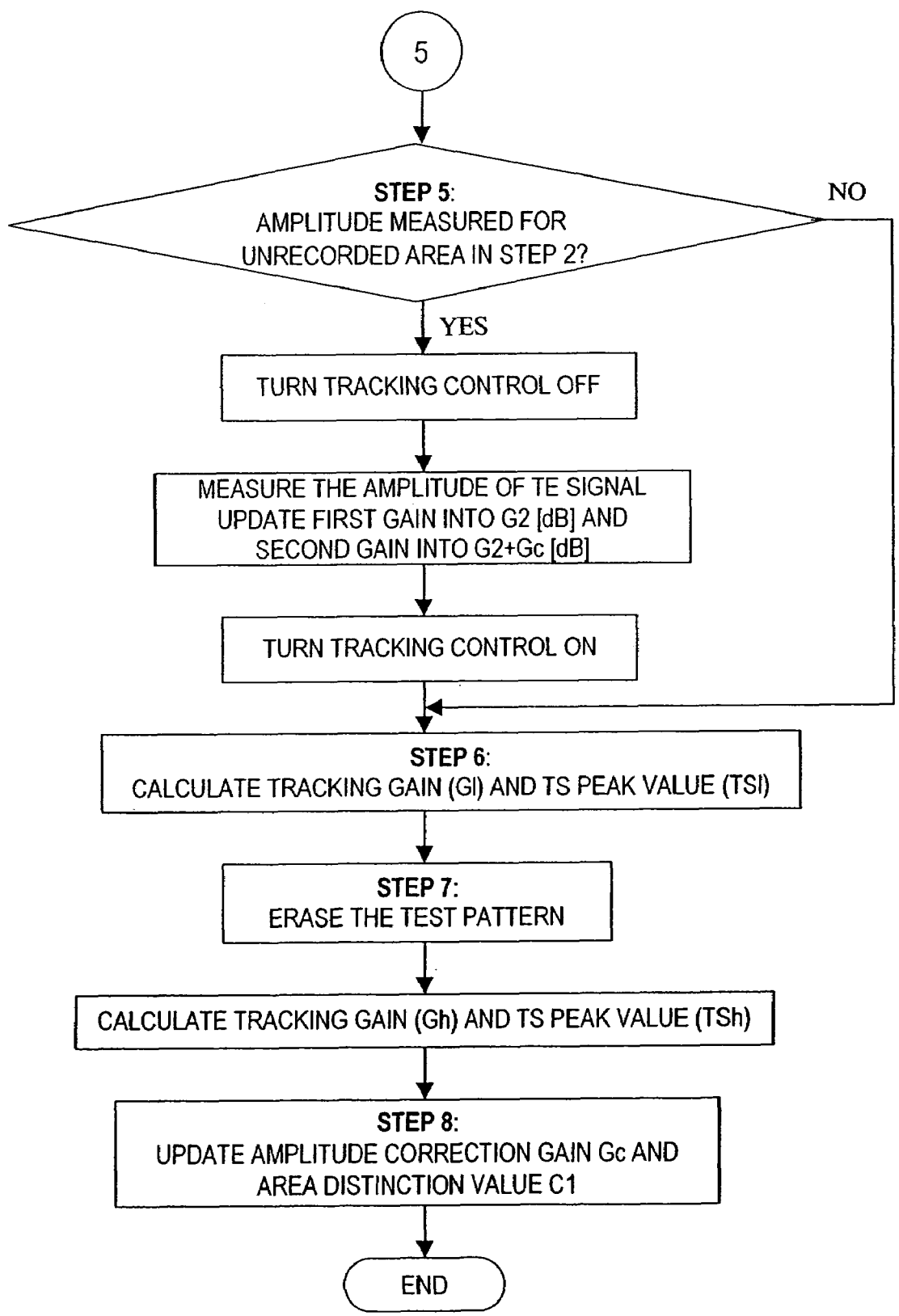

FIGS. 12A and 12B are a flowchart showing the sequence of operations to be performed by the tracking controller of this preferred embodiment to process such a rewritable high-density storage medium. As shown in FIG. 12A, after Steps 1, 2 and 3 have been carried out, the optical head 2 is moved to the OPC area in Step 4. Then, a test pattern is recorded on the OPC area by irradiating that area with the light beam that has been emitted from the optical head. Thereafter, the amplitude of the TE signal is measured with the test pattern recorded area regarded as the recorded area.

Also, after the tracking gain and the TS peak value have been calculated in Step 6, the test pattern recorded area of the OPC area is irradiated with the light beam again, thereby erasing the test pattern in Step 7. As a result, the test pattern recorded area is turned into an unrecorded area. By using this erased area as an unrecorded area, the tracking gain and the TS peak value are calculated again. Thereafter, by performing the same process steps as those shown in FIG. 6B, the same effects are also achieved.

In the sequence of operations shown in FIGS. 12A and 12B, Step 4 may be replaced with Step 4'. In that case, after Steps 1, 2 and 3 have been performed, the optical head 2 may be moved to the PIC area and the amplitude of the TE signal may be measured by using the data that has already been recorded on the PIC area in Step 4'. Thereafter, the optical head 2 is moved to the OPC area in Step 7, data is erased if necessary, and then Step 8 is performed.

In the sequence of operations shown in FIGS. 12A and 12B, after Step 3 has been performed, Step 7 may be carried out first, and then Steps 4, 5, 6 and 8 may be performed.

In the preferred embodiment described above, to make the gain of the tracking control loop constant for the recorded and unrecorded areas, the tracking error amplitude adjusting section 6 switches the first gain G1 or G2 into the second gain G1+Gc or G2+Gc. However, the same effects are also achievable even if the tracking control section 4 performs the function of switching the first and second gains.

Furthermore, in the preferred embodiment described above, a push-pull method is adopted as an exemplary tracking error detecting method. However, similar effects are also achievable even by a differential push-pull (DPP) method.

Embodiment 2

Figure 13:
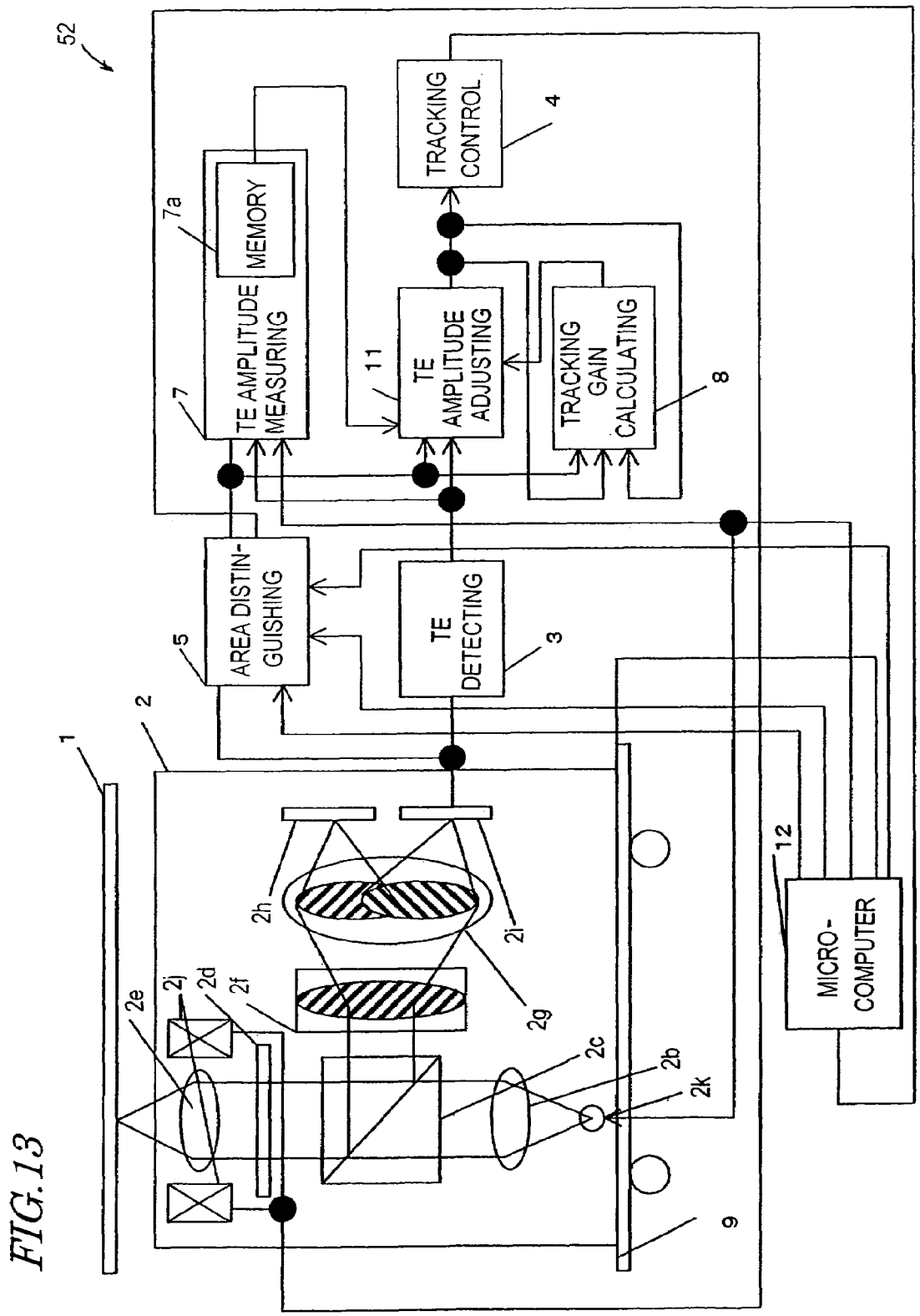
FIG. 13 is a block diagram showing a configuration for a tracking controller according to a second specific preferred embodiment of the present invention.

FIG. 13 is a block diagram showing a configuration for a tracking controller according to a second specific preferred embodiment of the present invention. In FIG. 13, each component of the tracking controller 52 of this second preferred embodiment, having substantially the same function as the counterpart of the tracking controller 51 of the first preferred embodiment shown in FIG. 1, is identified by the same reference numeral. The tracking controller 52 shown in FIG. 13 includes an alternative tracking error amplitude adjusting section 11 instead of the tracking error amplitude adjusting section 6 of the first preferred embodiment. Also, the microcomputer 12 of the tracking controller 52 outputs a write gate (WTGT) signal, which is used as a trigger to a write operation on the disc 1, to the semiconductor laser diode 2k and the tracking error amplitude adjusting section 11. Specifically, the microcomputer 12 outputs an H-level WTGT signal to start a write operation and an L-level WTGT signal to start a read operation. The semiconductor laser diode 2k can switch the optical output powers in response to the WTGT signal supplied from the microcomputer 12. Specifically, the semiconductor laser diode 2k can change its optical output power from a level for a write operation to another level for read and write operations, or vice versa.

Figure 14:
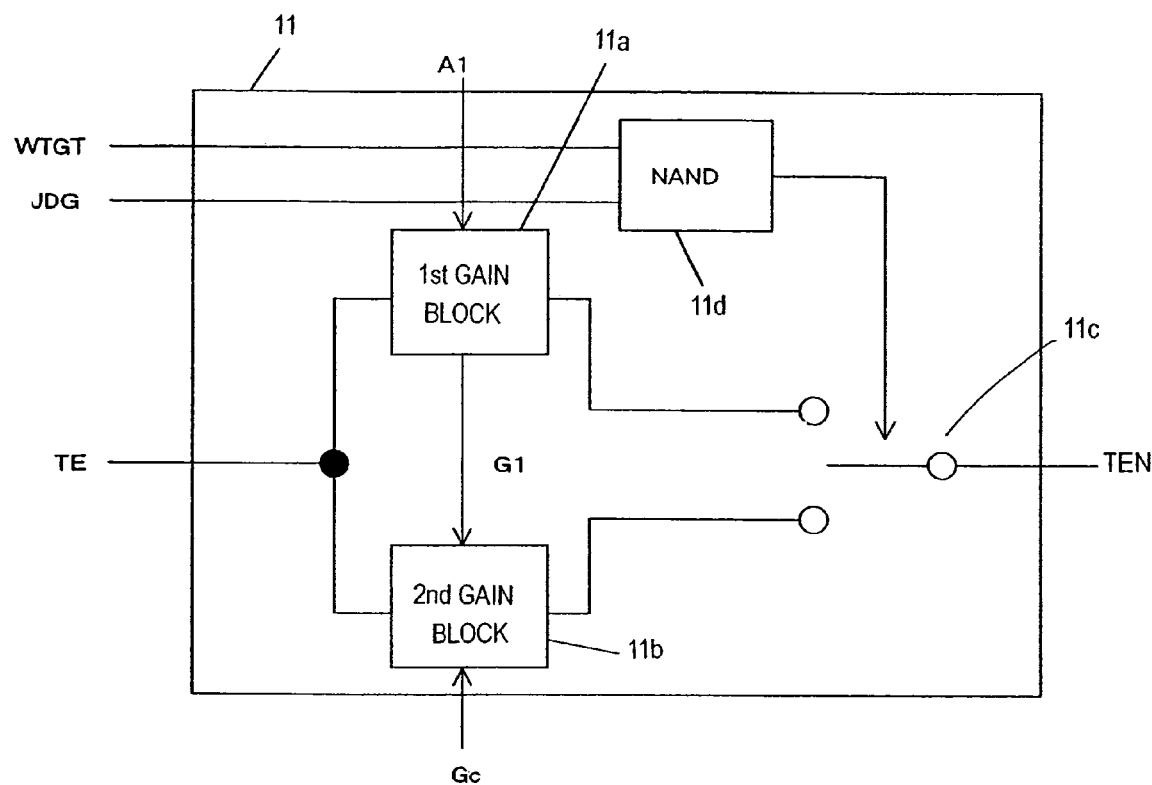
FIG. 14 is a block diagram showing a detailed configuration for the tracking error amplitude adjusting section of the tracking controller shown in FIG. 13.
Figure 15:
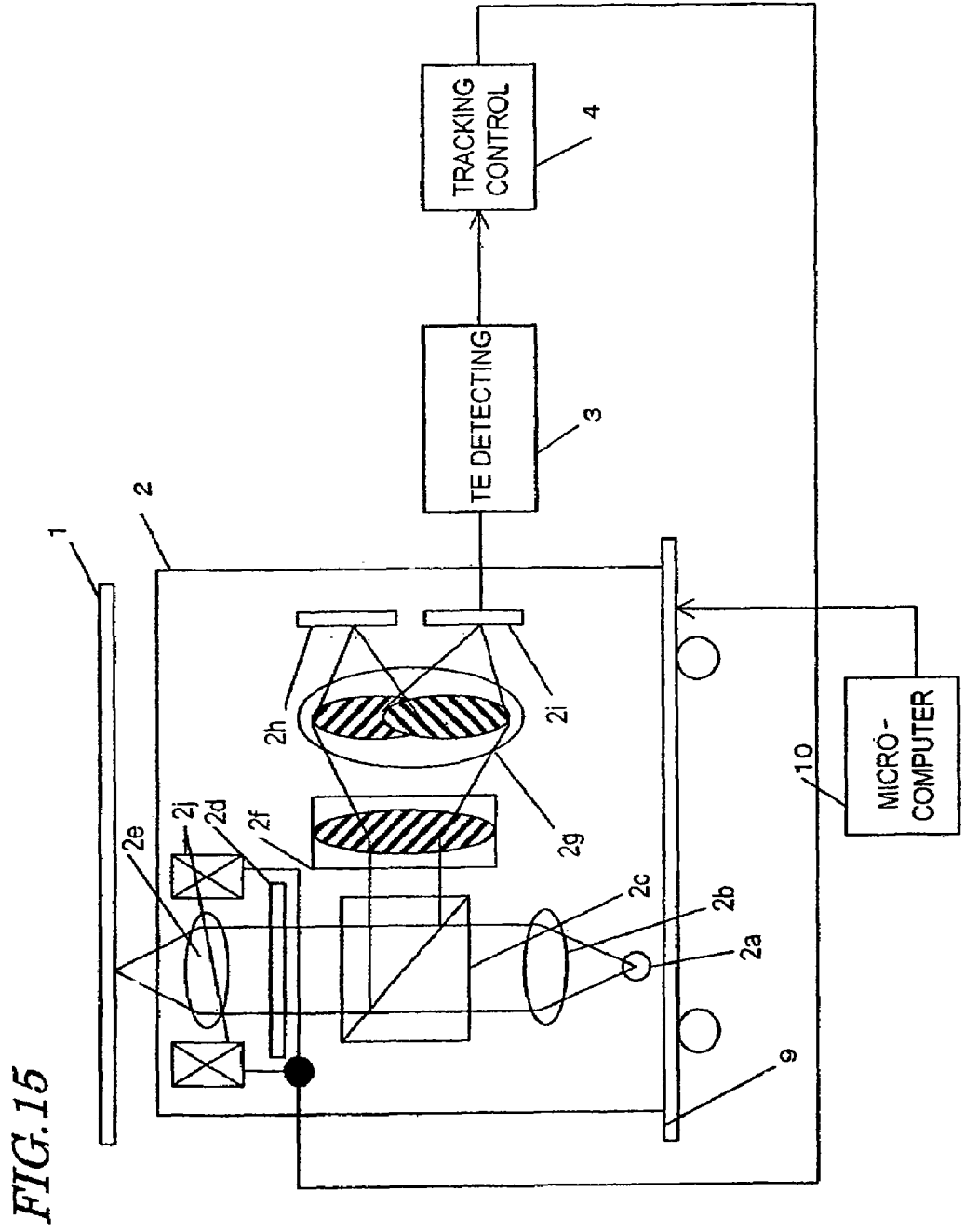
FIG. 15 is a block diagram showing a configuration for a conventional tracking controller.

As shown in FIG. 14, the tracking error amplitude adjusting section 11 includes a first gain block 11a, a second gain block 11b, a switch 11c and an NAND gate 11d. The first gain block 11a, second gain block 11b and switch 11e function just like the counterparts of the tracking error amplitude adjusting section 6 of the first preferred embodiment described above. The gains G1, G1+Gc, G2 and G2+Gc of the first and second gain blocks 11a and 11b are also defined as in the first preferred embodiment described above.

The NAND gate 11d receives the JDG signal from the area distinguishing section 5 and the WTGT signal from the microcomputer 12, respectively. However, only when the JDG and WTGT signals are both low (i.e., zero), the NAND gate 11d outputs a signal to the switch 11d. Specifically, only when the WTGT and JDG signals are both low (i.e., only while data is being read from the disc 1 and the focal point of the outgoing light beam is located on the recorded area), the product of the TE signal and the gain G1+Gc of the second gain block 11b is passed through the switch 11c as the TEN signal. On the other hand, if at least one of the WTGT and JDG signals is high, the product of the TE signal and the gain G1 of the first gain block 11a is passed through the switch 11c as the TEN signal.

Hereinafter, it will be described how the tracking controller 52 of this preferred embodiment works in writing data on the disc 1. In the following illustrative preferred embodiment, a DVD-R disc is also loaded as the disc 1.

To start a data write operation, the microcomputer 12 outputs an H-level WTGT signal to the semiconductor laser diode 2k and the tracking error amplitude adjusting section 11. In response, the optical output power of the semiconductor laser diode 2k is switched from about 0.7 mW, which is a level for reading, into about 5.0 mW, which is a level for writing. The light beam that has been emitted from the semiconductor laser diode 2k is passed through the collimator lens 2b, polarization beam splitter 2c, wave plate 2d and convergent lens 2e so as to be focused onto the data storage layer of the disc 1. In this manner, data is written on the disc 1.

The focused beam is reflected back from the data storage layer and then passes the same convergent lens 2e and wave plate 2d again following the same optical path. Thereafter, the reflected light beam is split by the polarization beam splitter 2c into two, one of which is separated from the original optical path so as to be incident onto the photo-detecting hologram 2f. On receiving the separated light beam, the photo-detecting hologram 2f diffracts the light beam by splitting it into a tracking-error-detecting minus-first-order light beam and a focus-error-detecting plus-first-order light beam. Subsequently, the tracking-error-detecting minus-first-order light beam and the focus-error-detecting plus-first-order light beam are incident onto the minus-first-order photodetector 2i and the plus-first-order photodetector 2h, respectively, and then converted into electric signals.

The output of the plus-first-order photodetector 2h is a focus error signal representing the focusing state of the light beam on the data storage layer of the disc 1. The position of the convergent lens 2e is controlled by a known method such that the focus error signal equals zero.

As already described for the first preferred embodiment, the minus-first-order photodetector 2i outputs the signals TR1 and TR2 to the tracking error detecting section 3. In response, the tracking error detecting section 3 generates a tracking error (TE) signal by a push-pull method.

The area distinguishing section 5 also receives the signals TR1 and TR2, compares the sum of these signals TR1 and TR2 with the area distinction value C1 to determine, based on the result of comparison, whether or not the focal point of the light beam on the disc 1 is located on the recorded area thereof, and outputs the JDG signal.

As described above, the tracking error amplitude adjusting section 11 receives, as control signals, the WTGT signal from the microcomputer 12 and the JDG signal from the area distinguishing section 5, respectively. Only when the WTGT and JDG signals are both low (i.e., only while data is being read from the disc 1 and the focal point of the outgoing light beam is located on the recorded area), the tracking error amplitude adjusting section 11 outputs the product of the TE signal and the gain G1+Gc of the second gain block 11b as the TEN signal. On the other hand, if at least one of the WTGT and JDG signals is high, the tracking error amplitude adjusting section 11 outputs the product of the TE signal and the gain G1 of the first gain block 11a as the TEN signal.

Accordingly, in writing data on the disc 1, the WTGT signal supplied from the microcomputer 12 is an H-level signal, and the tracking error amplitude adjusting section 11 outputs the product of the TE signal and the gain G1 of the first gain block 11a as the TEN signal. In this preferred embodiment, the disc 1 loaded is a DVD-R, which is a write-once disc. Thus, the disc area available for data writing must be an unrecorded area. If the tracking error amplitude adjusting section 6 receives the JDG signal as the only control signal as in the preferred embodiment shown in FIG. 4, then the TE signal might be multiplied by the gain G1+Gc of the second gain block 6b even in writing data on the disc 1. In contrast, if the tracking error amplitude adjusting section 11 receives both the JDG and WTGT signals as control signals as in the preferred embodiment shown in FIG. 14, the TE signal can be multiplied by the gain G1 of the first gain block 11a in recording pits on the disc 1. Accordingly, even during a write operation, the TE signal can keep the desired amplitude and the gain of the tracking control loop can also be kept constant. As a result, the tracking control can be carried out with good stability.

As explained in detail, according to the present invention, it is possible to perform the tracking control precisely and stably even the storage medium is a recordable or rewritable one. The tracking control apparatus of the present invention is suitably applied to various optical disc devices for using the storage medium such as CD-R, CD-RW, DVD-R, DVD-RW, a storage medium which can record the data at a higher recording density or a storage medium adapted to another recording format.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A tracking controller comprising
   a tracking error detecting section for generating and outputting a tracking error signal that represents how much the focal point of a light beam has shifted from a target track on a storage medium,
   a tracking control section for generating a drive signal in response to the tracking error signal so as to move the light beam such that the focal point of the light beam is located right on the target track,
   a tracking error amplitude adjusting section for multiplying the tracking error signal by a predetermined proportionality constant, and
   a tracking gain calculating section for calculating and storing a gain of a tracking control loop, which is defined by the tracking error detecting section, the tracking error amplitude adjusting section and the tracking control section, at an arbitrary frequency,
   wherein the gain of the tracking error signal is switched by changing the proportionality constant depending on whether or not the focal point of the light beam is located on a recorded area, and
   wherein a ratio of the gain that has been calculated by the tracking gain calculating section for the recorded area, on which the data has been written, to the gain that has been calculated by the tracking gain calculating section for an unrecorded area, on which the data has not yet been written, is used as the proportionality constant.

2. A tracking controller according to claim 1, wherein the gain of the tracking error signal is switched depending on whether or not data is being written on the storage medium and whether or not the focal point of the light beam is located on the recorded area.

3. The tracking controller of claim 1, further comprising a tracking error amplitude measuring section for measuring the amplitude of the tracking error signal,
   wherein the gain is switched depending on the amplitude that has been measured by the tracking error amplitude measuring section for the recorded area, on which the data has been written and the amplitude that has been measured by the tracking error amplitude measuring section for an unrecorded area, on which the data has not yet been written.

4. The tracking controller of claim 1, further comprising a light detecting section for detecting light that has been reflected from, or transmitted through, the storage medium, and
   an area distinguishing section for judging whether the focal point of the light beam is located on the recorded area or on the unrecorded area.

5. The tracking controller of claim 4, further comprising a transport section for moving the focal point of the light beam across the tracks on the storage medium,
   wherein an area distinction value is defined in advance based on the outputs of the light detecting section, the area distinction value being used to judge whether the focal point of the light beam is located on the recorded area or on the unrecorded area, the outputs having been obtained for the recorded area and the unrecorded area when the focal point of the light beam was moved by the transport section to the recorded area and to the unrecorded area, respectively, and
   wherein the area distinguishing section determines, by the area distinction value and the outputs of the light detecting section, whether the focal point of the light beam is located on the recorded area or on the unrecorded area.

6. The tracking controller of claim 5, wherein the area distinction value is defined based on peak values of the light beams that have been reflected from, or transmitted through, the recorded area and the unrecorded area, respectively, during a predetermined period.

7. The tracking controller of claim 1, further comprising a light source for emitting the light beam,
   wherein the unrecorded area is turned into the recorded area by writing data on the storage medium with the light beam focused thereon, or
   wherein the recorded area is turned into the unrecorded area by erasing data from the storage medium with the light beam focused thereon.

8. The tracking controller of claim 1, wherein the storage medium is a write-once storage medium.

9. The tracking controller of claim 1, wherein management information for the storage medium has been recorded in advance on the recorded area.

10. The tracking controller of claim 1, wherein the storage medium includes a region on which a test pattern to adjust the intensity of the light beam in writing data on the storage medium is to be wrote, and the region is used as the recorded area and the unrecorded area.

11. The tracking controller of claim 1, wherein the storage medium is a DVD-R disc, the recorded area is a data area or a control data zone, and the unrecorded area is a power calibration area.

12. The tracking controller of claim 1, wherein the storage medium is a CD-R disc or a CD-RW disc, the recorded area is a data area or a power calibration area, and the unrecorded area is constituted by the first or last 30 ATIP frames of a test area of the power calibration area.

13. The tracking controller of claim 1, wherein the storage medium is a DVD-RW disc, the recorded area is a data area or a recording management area, and the unrecorded area is a power calibration area.

14. The tracking controller of claim 1, wherein the storage medium is a high-density storage medium from/on which data is read or written by means of a light beam with a wavelength of 405 nm, the recorded area is a permanent information and control data area or an optimum power control area, and the unrecorded area is another optimum power control area.

15. An optical disc drive comprising the tracking controller of claim 1.

* * * * *